United States Patent [19]

Oyama et al.

[11] Patent Number: 5,496,175
[45] Date of Patent: Mar. 5, 1996

[54] QUESTIONNAIRE SYSTEM

[75] Inventors: Hiroaki Oyama, Yokohama; Tadashi Temma; Miyuki Maeda, both of Sagamihara; Tetsuo Kusuzaki, Kawasaki; Hiromichi Kimura, Yokohama; Kazumi Abe, Hoya; Naohiko Kunishi, Tokyo; Akira Kinefuchi, Hoya; Takahiro Miura, Matsudo, all of Japan

[73] Assignees: Hitachi, Ltd.; Nichirei Corporation, both of Tokyo, Japan

[21] Appl. No.: 831,194

[22] Filed: Jan. 31, 1992

[30] Foreign Application Priority Data

Feb. 1, 1991 [JP] Japan ..................... 3-11925

[51] Int. Cl.⁶ ........................... G09B 7/00
[52] U.S. Cl. .................. 434/118; 434/323; 434/362; 364/419.19
[58] Field of Search ................. 434/322, 350, 434/362, 118, 169, 323; 364/419, 419.1, 419.19; 359/927

[56] References Cited

U.S. PATENT DOCUMENTS

| Re. 31,951 | 7/1985 | Johnson et al. | 364/900 |
|---|---|---|---|
| 5,161,977 | 11/1992 | Thomas, Jr. | 434/322 |
| 5,195,033 | 3/1993 | Samph et al. | 364/419.2 |
| 5,204,813 | 4/1993 | Samph et al. | 364/419.2 |

FOREIGN PATENT DOCUMENTS

| 62-80718 | 4/1987 | Japan. |
|---|---|---|
| 62-250762 | 10/1987 | Japan. |
| 2-259889 | 10/1990 | Japan. |

OTHER PUBLICATIONS

RiskPAC, Computer Security Consultants Inc., released Jun. 1985.
Questionnaire Generator, Professor Corp., released 1984.
Great Creator, Professor Corp., released 1983.
Survey Manager 2.1, Insync Corp., released Aug. 1990.
Cl2 System for Computer Interviewing 2.3, Sawtooth Software, record creation date Nov. 9, 1992.
Teleview II, Software Science, Inc., first installed Jan. 1, 1985.

Primary Examiner—Gail O. Hayes
Assistant Examiner—J. L. Dixon
Attorney, Agent, or Firm—Fay, Sharpe, Beall, Fagan, Minnich & McKee

[57] ABSTRACT

A questionnaire producing and aiding system according to the present invention is arranged to store a questionnaire element including a question and a plurality of reply choices which have been previously produced in a memory thereof. When a questionnaire is produced, the saved questionnaire element is used while adding, correcting and deleting the contents so that a questionnaire sheet is produced. Therefore, the questionnaire producing operation can be performed efficiently. The data about the produced questionnaire sheet are stored in a portable recording medium.

The questionnaire reply gathering system according to the present invention is arranged to read data about the questionnaire sheet from the storage medium to display the contents of the questionnaire sheet on the terminal display apparatus, and to gather reply data supplied from the terminal input apparatus to be stored in the portable storage medium. The questionnaire reply gathering system is constituted by a small portable computer so that a questionnaire can be conducted after it has been moved to an arbitrary place.

The questionnaire totalizing and analyzing system according to the present invention performs a totalizing process and an analyzing process by reading instructed reply data from the storage medium.

As described above, data are transmitted/received between systems by means of the portable recording medium so that a necessity of establishing a direct connection between systems by using communication lines or external input apparatus can be eliminated, and thereby the handling facility can be improved.

18 Claims, 37 Drawing Sheets

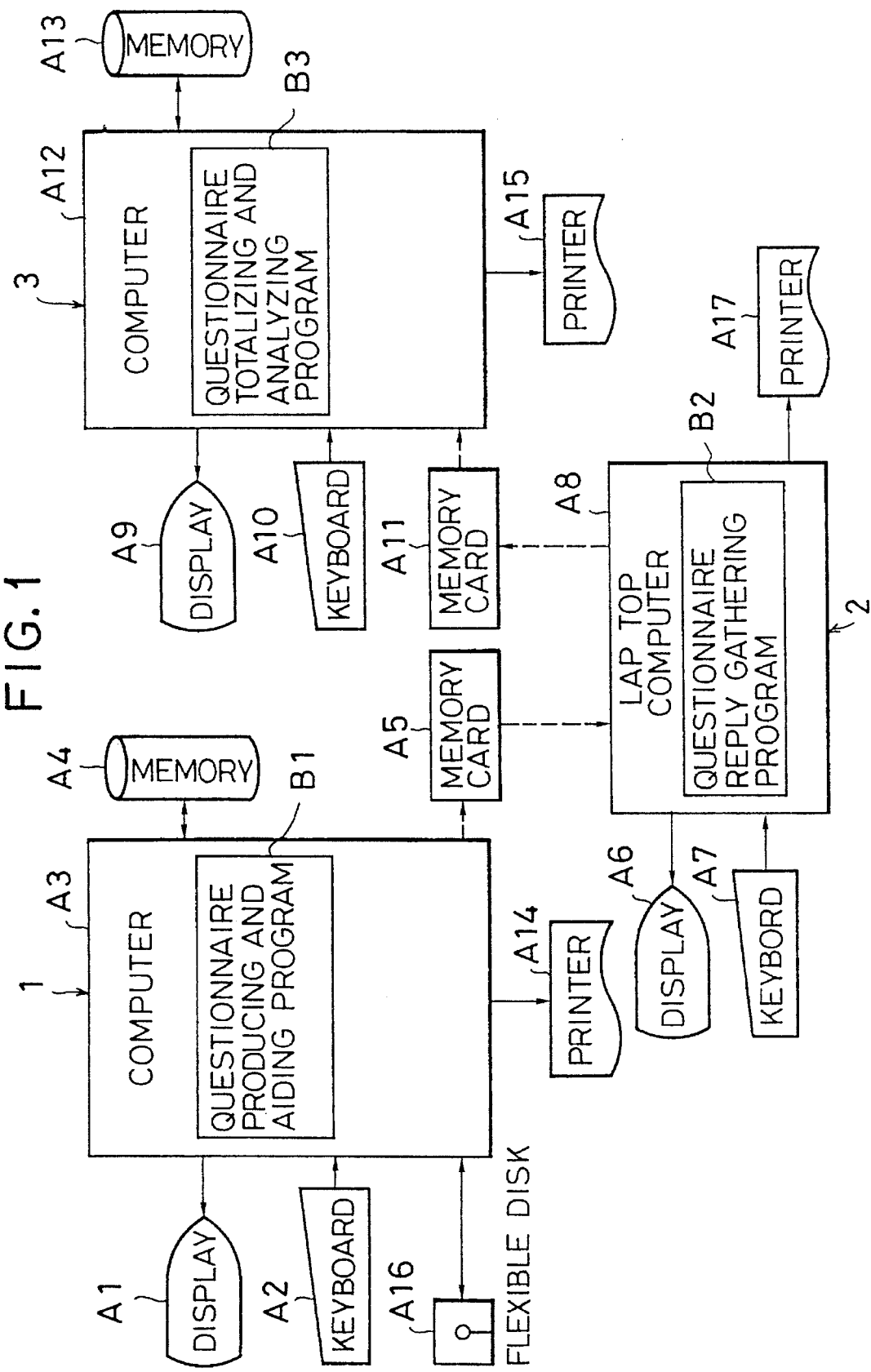

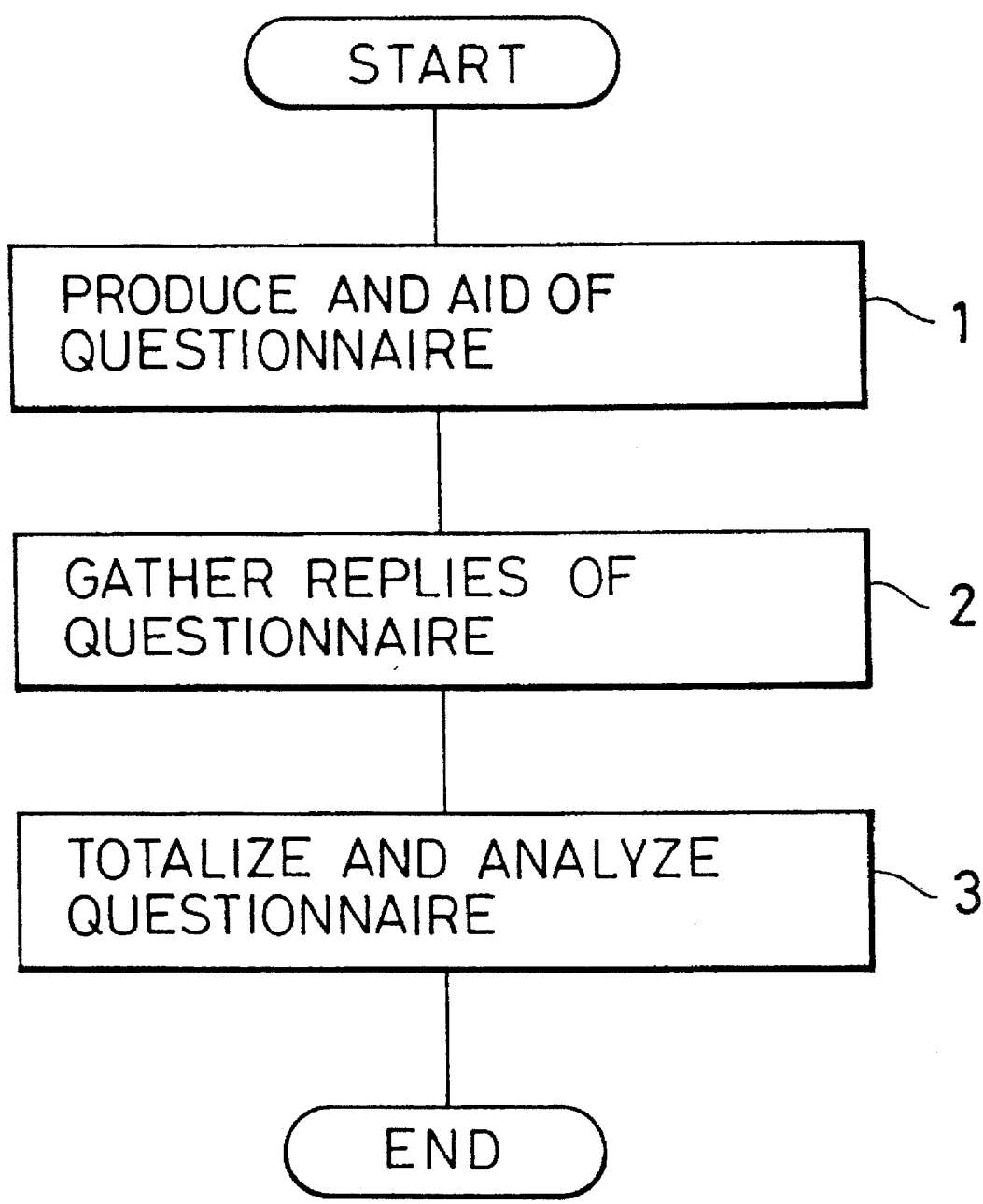

FIG. 4

| NUMBER OF RECORDS | QUESTIONNAIRE DATA FILE |
|---|---|
| 1 | TITLE OF QUESTIONNAIRE |
| 1 | NUMBER OF QUESTIONS |
| 1 | PR FRAME DATA |
| 1 | PRINT INFORMATION DATA |
| 1 | QUESTIONNAIRE ELEMENT DATA |
| 1 | QUESTIONNAIRE FRAME INFORMATION |
| 0 | NUMBER OF REPLIES OF QUESTIONNAIRE |
| 0 | DATA ABOUT QUESTIONNAIRE REPLY |

FIG. 5

| NUMBER OF RECORDS | REPLY DATA FILE |
|---|---|
| 1 | TITLE OF QUESTIONNAIRE |
| 1 | NUMBER OF QUESTIONS |
| 1 | PR FRAME DATA |
| 1 | PRINT INFORMATION DATA |
| 1 | QUESTIONNAIRE ELEMENT DATA |
| 1 | QUESTIONNAIRE FRAME INFORMATION |
| 1 | NUMBER OF REPLIES OF QUESTIONNAIRE |
| n | DATA ABOUT QUESTIONNAIRE REPLY |

FIG. 8

```
┌─────────────────────────────────────────────┐
│ ┌─────────────────────────────────────┐     │
│ │ QUESTIONNAIRE PRODUCING AND         │     │
│ │                       AIDING SYSTEM │     │
│ └─────────────────────────────────────┘     │
│   1. PRODUCING OF QUESTIONNAIRE             │
│   2. PRINTING OUT OF QUESTIONNAIRE          │
│   3. DOWN LOAD  OF QUESTIONNAIRE            │
│   4. EDITION OF QUESTION MASTER FILE        │
│   5. AUXILIARY FUNCTION                     │
│                                             │
│  99. QUIT                                   │
│  INDICATE No. OF THE PROCESS REQUIRED [ ]   │
└─────────────────────────────────────────────┘
```

FIG. 10

```
┌─────────────────────────────────────────┐
│      PRODUCING OF QUESTIONNAIRE         │
└─────────────────────────────────────────┘
 1. PRODUCING OF PR FRAME
 2. PRODUCING OF PRINT INFORMATION
 3. PRODUCING OF QUESTIONNAIRE
 4. COMBINATION OF DATA

99. QUIT
INDICATE No. OF THE PROCESS REQUIRED [ ]
```

FIG. 12

```
┌─────────────────────────────────────────────┐
│   ┌─────────────────────────────────────┐   │
│   │      PRODUCING OF PR FRAME          │   │
│   └─────────────────────────────────────┘   │
│     1. NEW PRODUCING                        │
│     2. CHANGE OF SAVED DATA                 │
│                                             │
│   99. QUIT                                  │
│   INDICATE No. OF THE PROCESS REQUIRED [ ]  │
│                                             │
│                                             │
└─────────────────────────────────────────────┘
```

FIG. 14

| PRODUCING PRINT INFORMATION |

1. NEW PRODUCING
2. CHANGE OF SAVED DATA

99. QUIT
INDICATE No. OF THE PROCESS REQUIRED [ ]

FIG. 15

PRINT INFORMATION

QUESTIONNAIRE SYSTEM

NOVEMBER 12, 1990

THANK YOU FOR REPLYING TO THIS QUESTIONNAIRE. YOU CAN GET A SPECIAL PENCIL WHEN YOU HAVE 10 POINTS

SERVICE POINT 2 POINTS

FIG.17A

PRODUCING OF QUESTIONNAIRE SHEET

1. NEW PRODUCING
2. CHANGE OF SAVED DATA

99. QUIT

INDICATE No. OF THE PROCESS REQUIRED [ ]

FIG.17B

Q1 WHAT DO YOU BELONG TO? (SINGLE ANSWER)
1. ELEMENTARY  2. JUNIOR          3. HIGH       4. COLGE  5. FULL-FLEDGED
   SCHOOL         HIGH SCHOOL       SCHOOL                    MEMBER OF SOCIETY

Q2 CHOOSE THE FOODS WHICH WERE INCLUDED IN YOUR LUNCH MENU
1. RICE  2. BREAD  3. MISO  4. VEGETABLE  5. MEAT
6. FISH  7. FRUIT  8. OTHERS

PERSONS WHO SELECTED "FULL-FLEGDED MEMBER OF SOCIETY" ON Q1
(SWITCHING OF ANSWER DISPLAY WHEN A SPECIFIC CHOICE IS MADE)
Q3 DO YOU HAVE SOCIAL INSURANCE?
1. YES    2. NO

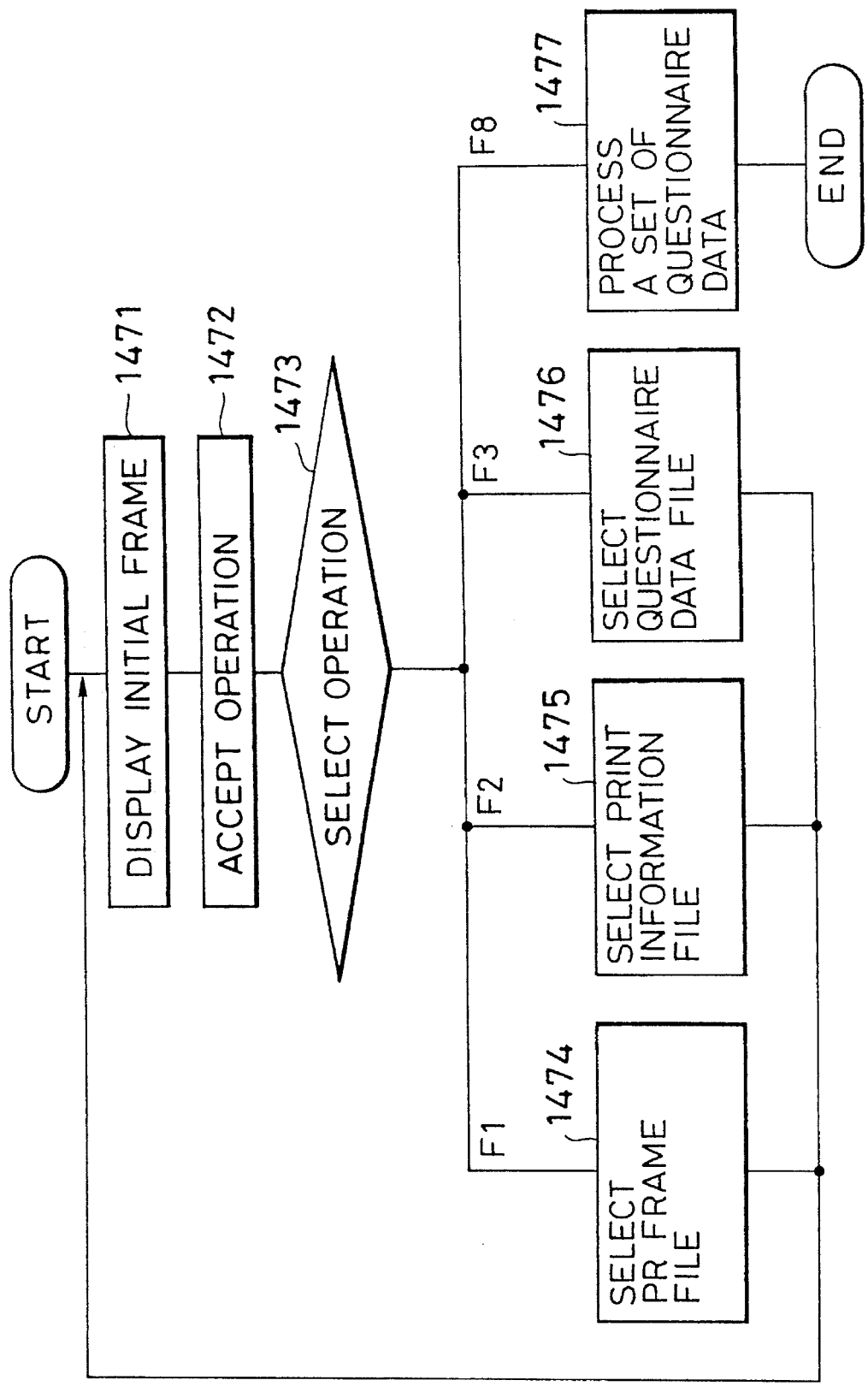

FIG. 19A

```
┌─────────────────────────────────────────────────────────┐
│                  │ DATA COMBINATION │                    │
│  ◇ PR FRAME              [        ] [              ]    │
│  ◇ PRINT INFORMATION     [        ] [              ]    │
│  ◇ QUESTIONNAIRE DATA    [        ] [              ]    │
│  [F1]: PR      [F2]: PRINT      [F3]: QUESTIONNAIRE  [F8]: QUIT
│      INFORMATION   INFORMATION    SHEET                  │
│                                                          │
└─────────────────────────────────────────────────────────┘
```

FIG. 19B

```
┌─────────────────────────────────────────────────────────┐
│                  │ DATA COMBINATION │                    │
│  ◇ PR FRAME              [TEST 01] [TEST GAMEN1 1998.83]│
│  ◇ PRINT INFORMATION     [       ] [NEEDLESS          ] │
│  ◇ QUESTIONNAIRE SHEET [TEST 01] [TEST                ] │
│  [F1]: PR      [F2]: PRINT      [F3]: QUESTIONNAIRE  [F8]: QUIT
│      INFORMATION   INFORMATION    SHEET                  │
│         1. REGISTER AND QUIT                             │
│         2. NO REGISTER AND QUIT                          │
│         3. CANCEL [ ]                                    │
└─────────────────────────────────────────────────────────┘
```

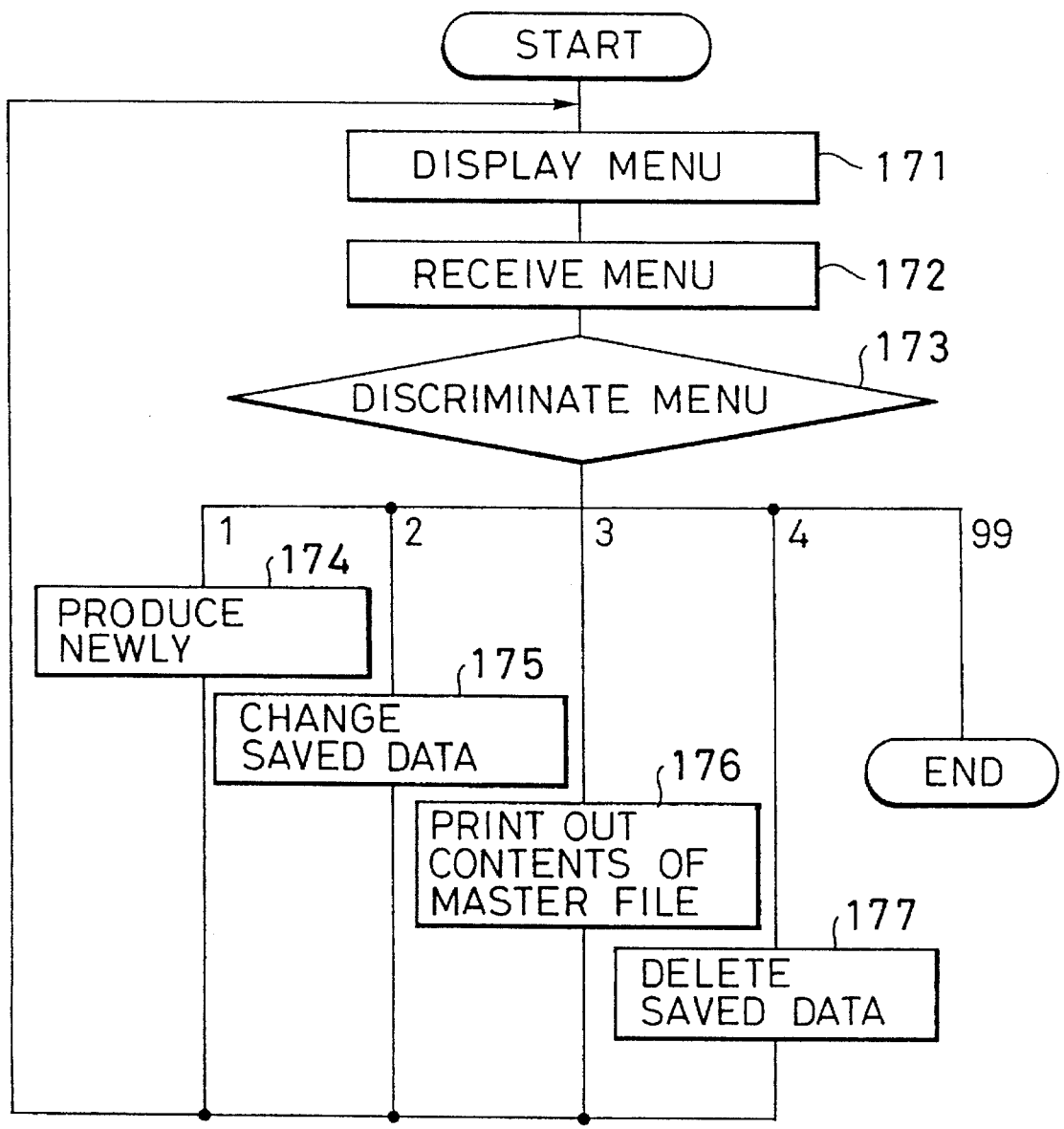

FIG. 21

| EDITION OF QUESTION MASTER |

1. NEW PRODUCING
2. CHANGE OF SAVED DATA
3. PRINTING OUT OF CONTENTS OF MASTER FILE
4. DELETE SAVED DATA

99. QUIT

INDICATE No. OF THE PROCESS REQUIRED 【 】

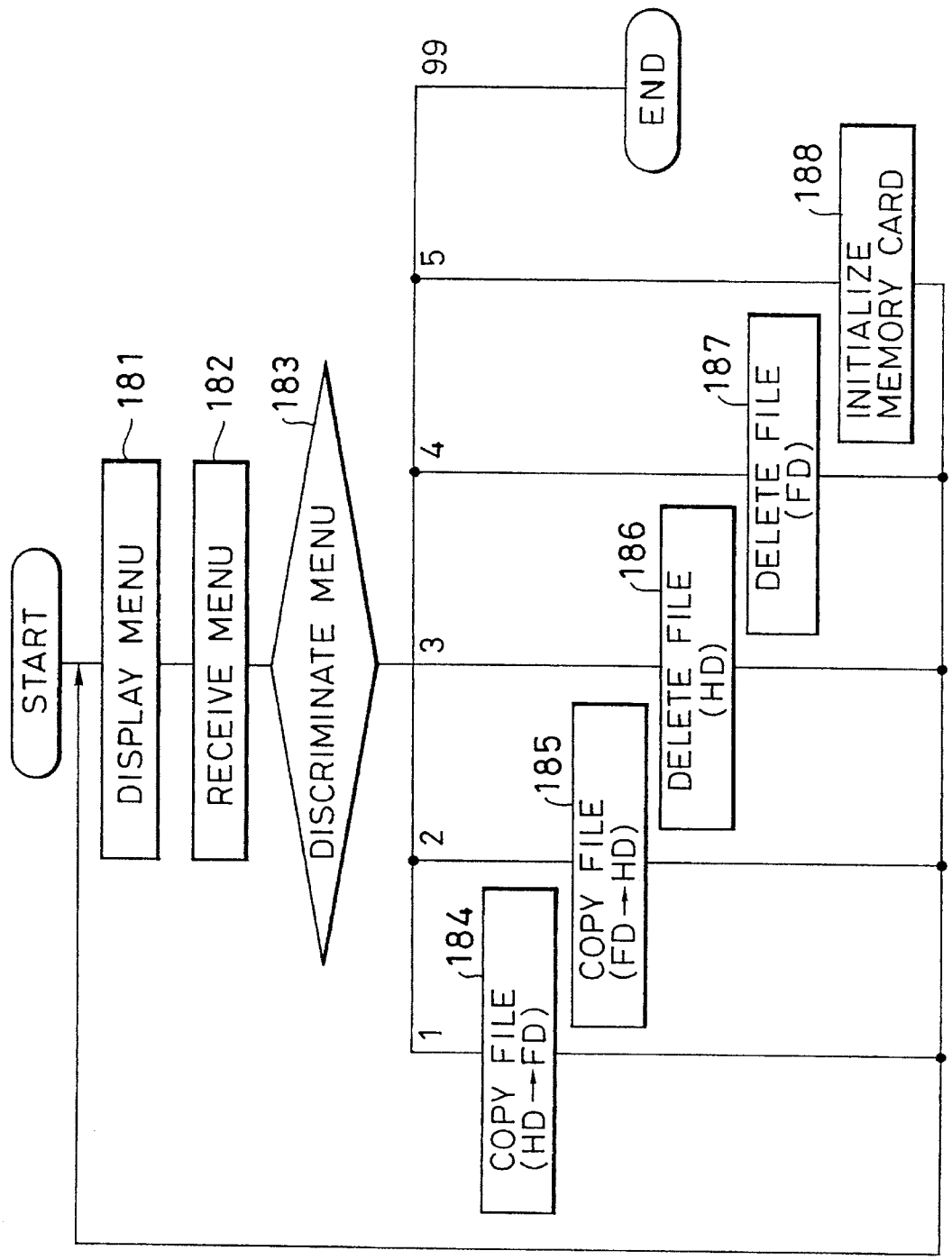

FIG. 23

```
┌─────────────────────────────────────────────┐
│         ┌──────────────────────┐            │
│         │  AUXILIARY FUNCTION  │            │
│         └──────────────────────┘            │
│      1. COPYING OF FILE (HD → FD)           │
│      2. COPYING OF FILE (FD → HD)           │
│      3. DELETION OF FILE (HD)               │
│      4. DELETION OF FILE (FD)               │
│      5. INITIALIZATION OF MEMORY CARD       │
│                                             │
│     99. QUIT                                │
│   INDICATE No. OF THE PROCESS REQUIRED [ ]  │
│                                             │
└─────────────────────────────────────────────┘
```

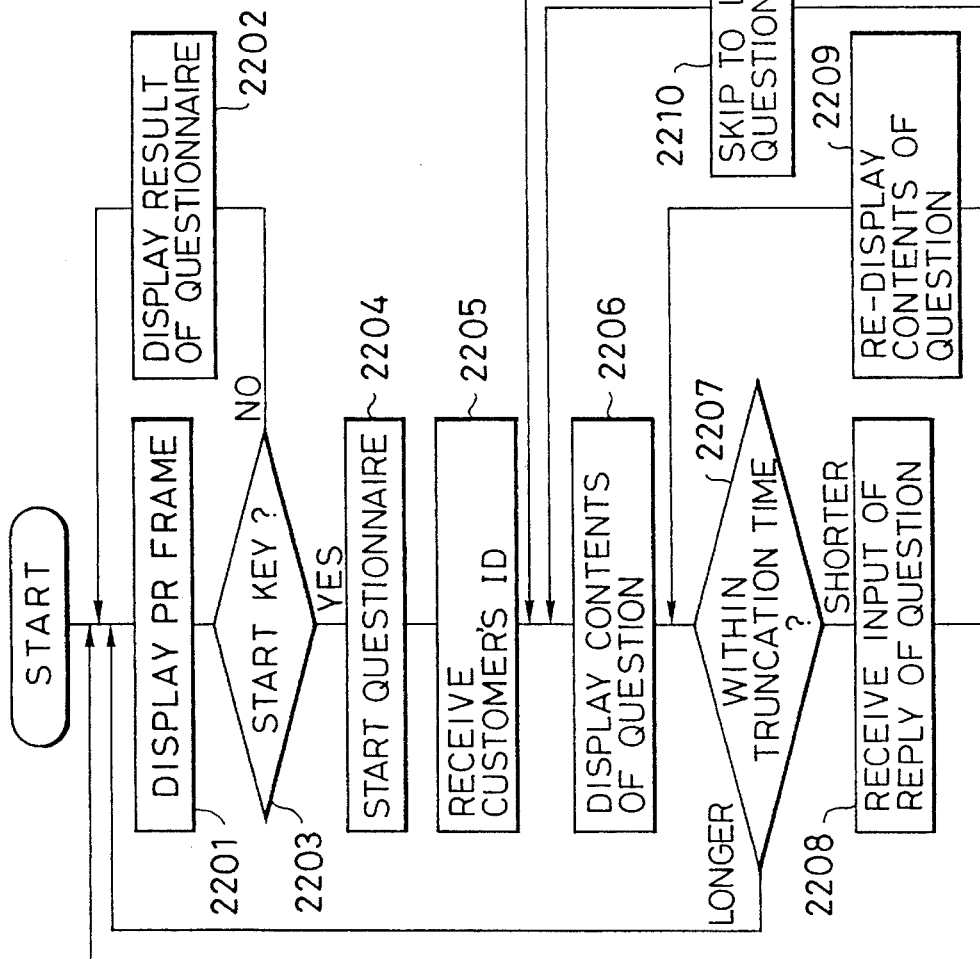

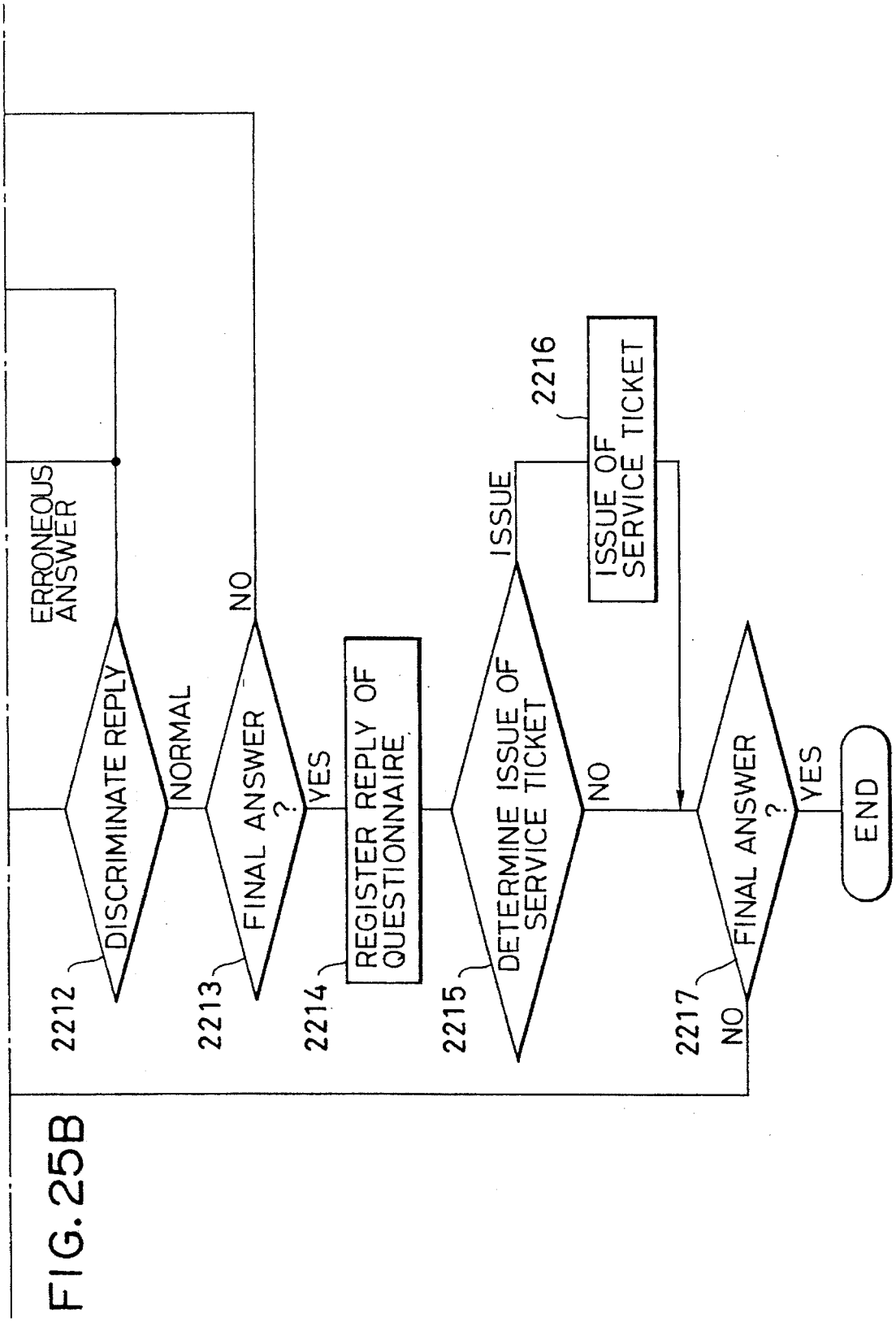

FIG. 28

| QUESTIONNAIRE TOTALIZATION AND ANALYSIS SYSTEM |

1. READING OF QUESTIONNAIRE REPLY DATA
2. PRODUCING OF TOTAL TABLE
3. PRODUCING OF CROSS TABLE
4. PRODUCING OF TOTAL TABLE & CROSS TABLE
5. OUTPUT OF LIST FOR INDIVIDUAL SHEET
6. RETRIEVAL OF CONDITION OF QUESTIONNAIRE RESULT

99. QUIT
   INDICATE No. OF THE PROCESS REQUIRED 【 】

FIG.29

Q1. WHAT IS YOUR OPINION ABOUT THIS QUESTIONNAIRE SYSTEM

| 1.EXCELLENT SYSTEM | 2.GOOD SYSTEM | 3.SOMETHING MUST BE MODIFIED | 4.NOT ATTRACTIVE | 5.I CAN NOT UNDERSTAND THIS SYSTEM | TOTAL |
|---|---|---|---|---|---|
| 23 | 7 | 41 | 66 | 46 | 189 |
| 12.8 | 3.7 | 23.0 | 35.8 | 24.6 | 100.0(%) |

Q2. WHAT IS....?

FIG. 30A

```
PRODUCING OF CROSS TABLE

SELECT TOTAL TABLE FILE

[TEST]  TEST1  TEST3  TEST4  TEST5  TEST6

F1: NEXT    F2: PREVIOUS
        PAGE        PAGE
```

FIG. 30B

```
PRINTING OF CROSS TABLE
```

|   | QUESTION No. | | | | | | |
|---|---|---|---|---|---|---|---|
|   | Q1 | Q2 | Q3 | Q4 | Q5 | Q6 | Q7 |
| Q1 |   |   |   |   |   |   | ▨ |
| Q2 |   |   |   |   |   |   |   |
| Q3 |   |   |   |   |   |   |   |
| Q4 |   |   |   |   |   |   |   |
| Q5 |   |   |   |   |   |   |   |
| Q6 |   |   |   |   |   |   |   |
| Q7 |   |   |   |   |   |   |   |

(QUESTION No.)

[F1]: SHIFT TO RIGHT
[F2]: SHIFT TO LEFT
[F3]: SHIFT UPWARDS
[F4]: SHIFT DOWNWARDS
CURSOR

[F6]: SELECT   [SPACE]: CANCEL   [F5]: START OUTPUT   [F8]: QUIT

FIG.31

Q1. WHAT IS YOUR OPINION ABOUT THIS QUESTIONNAIRE

QUESTION TO BE CROSS TOTALIZED

Q7. WHAT IS YOUR OPINION ABOUT EQUIPMENT OF THIS QUESTIONNAIRE SYSTEM

| Q8 \ Q7 | 1. ALREADY EQUIPPED | 2. ALTHOUGH IT HAS BEEN EQUIPPED, IT MUST BE MODIFIED | 3. TO BE EQUIPPED WITHIN TWO YEARS | 4. TO BE EQUIPPED WITHIN FOUR YEARS | 5. TO BE EQUIPPED IN THE FUTURE THOUGH THE TIME IS NOT DECIDED | 6. NOT TO BE EQUIPPED |
|---|---|---|---|---|---|---|
| 1. EXCELLENT SYSTEM | 5<br>2.6 | 47<br>24.9 | 20<br>10.6 | 4<br>2.1 | 56<br>29.6 | 57<br>30.2 |
| 2. GOOD SYSTEM | 2<br>4.3 | 8<br>17.4 | 3<br>6.5 | 1<br>2.2 | 11<br>23.9 | 21<br>45.7 |
| 3. SOMETHING MUST BE MODIFIED | 1<br>1.5 | 21<br>31.8 | 7<br>10.6 | 0<br>0.0 | 17<br>25.8 | 20<br>30.3 |
| 4. NOT ATTRACTIVE | 0<br>0.0 | 12<br>29.3 | 6<br>14.0 | 2<br>4.9 | 16<br>39.0 | 5<br>12.2 |
| 5. I CANNOT UNDERSTOOD THIS SYSTEM | 1<br>4.3 | 3<br>13.0 | 1<br>4.3 | 0<br>0.0 | 9<br>39.1 | 9<br>39.1 |

FIG.32

| | | TOTAL | 1 EXCELLENT SYSTEM | 2 GOOD SYSTEM | 3 IN ACCORDANCE WITH OUR SPECIFIC CONDITION | 4 NOT ATTRACTIVE | 5 I CANNOT UNDERSTAND THIS SYSTEM |
|---|---|---|---|---|---|---|---|
| 6 | NOT TO BE EQUIPPED | 57 / 30.2 | 21 / 45.7 | 20 / 30.3 | 5 / 12.2 | 0 / 0.0 | 0 / 39.1 |
| 5 | TO BE EQUIPPED IN THE FUTURE THROUGH THE TIME IS NOT DECIDED | 56 / 29.6 | 11 / 23.9 | 17 / 25.8 | 16 / 39.0 | 3 / 42.9 | 0 / 39.1 |
| 4 | TO BE EQUIPPED WITHIN FOUR YEARS | 4 / 2.1 | 1 / 2.2 | 0 / 0.0 | 2 / 4.9 | 1 / 14.3 | 0 / 0.0 |
| 3 | TO BE EQUIPPED WITHIN TWO YEARS | 20 / 10.6 | 3 / 6.5 | 7 / 10.6 | 6 / 14.0 | 0 / 0.0 | 1 / 4.3 |
| 2 | ALTHOUGH IT HAS BEEN EQUIPPED, IT MUST BE MODIFIED/IMPROVED | 47 / 24.9 | 8 / 17.4 | 21 / 31.8 | 12 / 29.3 | 2 / 28.6 | 3 / 13.0 |
| 1 | A SATISFACTORY SYSTEM HAS BEEN EQUIPPED | 5 / 2.6 | 2 / 4.3 | 1 / 1.5 | 0 / 0.0 | 1 / 14.3 | 1 / 4.3 |
| | TOTAL | 189 / 100.0 | 46 / 100.0 | 56 / 100.0 | 41 / 100.0 | 7 / 100.0 | 23 / 100.0 |

FIG. 33

```
NAME: HANAKO YAMADA
NAME OF
COMPANY: Y ELECTRIC CO, LTD.
POSITION: MANAGER

Q1: Ans 1
Q2: Ans 3
Q3: Ans 1

DATE OF
         QUESTIONNAIRE: 17:00,
                        NOVEMBER 21
```

FIG. 35A

```
┌─────────────────────────────────┐
│ RETRIEVAL OF CONDITION OF       │
│ QUESTIONNAIRE RESULT            │
└─────────────────────────────────┘
     SELECT RAW DATA FILE

[TEST]  TEST1  TEST2  TEST3

F1:NEXT    F2:PREVIDUS
          PAGE       PAGE
```

FIG. 35B

```
┌─────────────────────────────────┐
│ RETRIEVAL OF CONDITION OF       │
│ QUESTIONNAIRE RESULT            │
└─────────────────────────────────┘
               QUESTION    REPLY
                 No.        No.
  CONDITION  1   [1 ]      [1 ]
             2   [1 ]      [1 ]
             3   [  ]      [  ]
             4   [  ]      [  ]
             5   [  ]      [  ]
  RELATIONAL EXPRESSION [1]  1:AND  2:OR

RETRIEVAL HAS BEEN DONE, RESULTING IN
  9 APPLICABLE RECORDS TO BE FOUND.
  [F1]:CONTACT [F2]:RETRIEVAL [F3]:OUTPUT  [F8]:QUIT
                                   RESULT
```

FIG. 36

Q1. DO YOU PLAN TO EQUIP THIS QUESTIONNAIRE SYSTEM?

Ans. TO BE EQUIPPED WITHIN THREE TO FOUR YEARS

| NAME | COMPANY NAME | DEPARTMENT | POST |
|---|---|---|---|
| TARO YAMADA | X TRADING CO.,LTD | PLANNING DEPARTMENT | DEPARTMENT MANAGER |
| HANAKO OGAWA | Y ELECTRIC CO.,LTD | MAIN BUSINESS DEPARTMENT | SECTIONAL HEAD |
| ... | ... | ... | ... |

QUESTIONNAIRE SYSTEM

BACKGROUND OF THE INVENTION

1. Field of the Invention

The present invention relates to a questionnaire system, and, more particularly, to a questionnaire producing and aiding system, a questionnaire reply-gathering terminal system and a questionnaire totalizing and analyzing system relating to a sequential operation to be carried out when a questionnaire is answered. More particularly, the present invention relates to a system for handling a variety of questionnaires that are frequently answered, such as in a survey, wherein a large quantity of replies obtained to the questionnaires are collected, totalized and analyzed.

2. Description of the Related Art

A questionnaire or survey that is conducted of passerbys or customers commonly utilizes questionnaire sheets on which, for example, questions and multiple-choice answers are provided. Replies to such questionnaires are gathered, totalized and analyzed using a processing apparatus such as a computer, which consumes considerable time for inputting reply data, for example. Therefore, the questionnaires are preferably answered, collected and the data entered into the computer roughly simultaneously, to save time. This often results in very high labor costs.

Systems, such as those disclosed in Japanese Patent Laid-Open No. 2-259889, Japanese Patent Laid-Open No. 62-80718 and Japanese Patent Laid-Open No. 62-250762, have thus been developed in which those who answer the questionnaires directly input their replies to the computer.

By way of example, the system disclosed in JP 2-259889 provides a questionnaire source computer connected to a questionnaire reply computer by communication lines. According to this system, questionnaire sheets are electronically distributed from the questionnaire source apparatus to questionnaire reply terminals using the communication lines. Each person replying to the questionnaire reads the contents of the questionnaire sheet displayed at a questionnaire reply terminal, and replies to the questionnaire by using an input device such as a keyboard. The questionnaire source apparatus gathers the reply data from the questionnaire reply terminals, and totalizes and analyzes the reply. Thus, personal labor is significantly reduced.

A reply input apparatus disclosed in JP 62-80718 includes a plurality of small-sized data terminals or personal computers, wherein the questionnaire replies are directly input via a keyboard, for example. The reply display portion, which displays plural answer choices, is formed to correspond to the layout of the keyboard. The configurations of the question display portion and the reply display portion are arranged so that the questions and reply choices can be inspected with a correspondency to each other. Furthermore, the plural reply choices are disposed to correspond to plural key switches on the keyboard. Therefore, manual operations such as distributing questionnaire sheets, gathering replies and inputting reply data are avoided. Furthermore, the content of the questionnaires (i.e., the questions and answers) can be changed in a relatively simple fashion, without necessitating the production of additional hard copies of questionnaires, since the changes can be made on-line.

However, each of the latter two conventional systems is directed to improving the efficiency of the reply gathering operation and the operation of inputting data to the computer. Neither system is directed to reducing labor for producing the questionnaire itself. Therefore, excessive labor is still required to produce the questionnaire sheet.

Moreover, the system disclosed in JP 62-80718 requires a correspondency between questions and replies with the keyboard. Therefore, the content of the questionnaire is limited by the keyboard. That is, since the number of key switches on the keyboard is finite, the number and style of the questionnaire sheets is limited.

Additionally, the system disclosed in JP 2-259889 requires the questionnaire source apparatus and the questionnaire reply terminals to be connected by dedicated communication lines. Therefore, the possible locations for providing questionnaire reply terminals are limited, and may prevent the questionnaire reply terminals from being placed at particularly desirable locations, such as along streets or in storefronts. However, the reply input apparatus of JP 62-80718 may be a portable personal computer, which may be easily moved to such locations.

However, even this system is subject to a limitation in which, since answers to the questionnaire are gathered on a magnetic disk, they must be input to the questionnaire totalizing and analyzing apparatus via a communication line or an external input apparatus. Therefore, the questionnaire reply terminal must be relocated to a position where a communication line is available, or to where the questionnaire source apparatus or the questionnaire gathering and analyzing apparatus is disposed. Particularly for a questionnaire that is distributed over a wide area by using multiple questionnaire reply terminals, attempts to access the questionnaire gathering and analyzing apparatus via communication lines from remote questionnaire reply terminals prevents smooth transmission of data to the totalizing and analyzing system.

Additionally, according to each of the conventional systems described above, no identification information is provided to each person answering the questionnaire. Thus, the systems do not produce data concerning information items regarding the answerer vis-á-vis the question and content of the reply.

SUMMARY OF THE INVENTION

A first object of the present invention is to provide a questionnaire producing and aiding system capable of easily producing a questionnaire sheet.

A second object of the invention is to provide a questionnaire reply-gathering system capable of distributing a questionnaire to an arbitrary place so that the questionnaire may be answered and the answers analyzed, regardless of the number of questionnaire items. The questionnaire and reply data are also capable of easy transmission/reception.

A third object of the present invention is to provide a questionnaire system capable of improving the efficiency of sequential operations while achieving the first and second objects described above.

A fourth object of the present invention is to provide a questionnaire system that is capable of, in addition to the third object just described, producing various questionnaire analysis data items, including analysis data relating to the replier vis-á-vis the question and answer.

In order to achieve the first object, the questionnaire producing and aiding system constructed according to the teachings of the present invention includes a questionnaire producing and aiding apparatus, an input apparatus, a display apparatus and a memory, each of which is connected to the questionnaire producing and aiding apparatus. The memory stores a questionnaire element which includes questions and their respective multiple-choice answers which have been previously produced by a questionnaire producing means of the questionnaire producing and aiding apparatus. The questions and answers are displayed on the display apparatus.

The system further includes editorial processing means for reading the present questionnaire element from the memory in accordance with a command input from the input apparatus, to display it at a predetermined position on the display apparatus, and for performing an addition, correction or deletion process with respect to the contents of the questionnaire displayed on the display apparatus. Writing means are provided for storing data concerning the questionnaire into a portable recording medium.

Thus, according to the present invention, the memory stores data concerning the questionnaire which has been previously produced, so that the data can be utilized when necessary to produce the questionnaire for a respondent. As a result, the questionnaire can be produced efficiently in comparison to the prior art, wherein the questionnaire is newly produced for each respondent.

Preferably, the memory includes a file that stores the information by questionnaire element, and a file that stores the questionnaire elements by questionnaire, each questionnaire including plural questionnaire elements. Furthermore, the editorial processing means preferably reads one of the two files in accordance with the input command. As a result, the efficiency of the questionnaire-producing operation can be further improved.

The complete questionnaire should also be stored in memory to make it available at the next questionnaire-producing request.

Additionally, the questionnaire producing and aiding apparatus preferably has a PR frame producing means for producing a PR frame, including the title and object of the questionnaire, and print information producing means for producing print information, such as a service ticket, to be given to the respondent of the questionnaire.

To achieve the second object, the questionnaire reply-gathering system includes a questionnaire reply-gathering terminal, an input apparatus and a display apparatus connected to the questionnaire reply-gathering terminal. The questionnaire reply-gathering terminal includes a connector for connecting a portable storage medium in which data concerning a questionnaire are stored, reply-gathering means for reading a questionnaire element from the storage medium to display a question and multiple answer choices on the display apparatus in accordance with instructions contained in the read questionnaire and for gathering reply data to the displayed question supplied from the input apparatus, and writing means for storing the reply data gathered by the reply-gathering means in a portable medium.

Therefore, according to the present invention, the questionnaire reply-gathering system produces questionnaire data which can be transmitted/received from/by a portable recording medium, so that the necessity of directly connecting the questionnaire reply-gathering system to the questionnaire producing and aiding system via a communication line or an external input apparatus can be eliminated. Accordingly, the handling capability is improved.

Preferably, the questionnaire reply-gathering terminal includes a small portable computer so that the questionnaire can be answered at an arbitrary place after the computer has been transported to the arbitrary place. Furthermore, the storage medium preferably comprises an IC card to prevent damage of data, which might be lost if the storage medium were a flexible disk.

In order to achieve the third object described above, the questionnaire system according to the present invention includes a questionnaire totalizing and analyzing system in addition to the questionnaire producing and aiding system and the questionnaire reply-gathering system. The questionnaire totalizing and analyzing system reads the instructed reply data from the storage medium which stores reply data gathered by the questionnaire reply-gathering system to perform the totalizing process and the analyzing process.

According to the questionnaire system of the present invention, then, data are transmitted/received between the systems using a portable recording medium. Therefore, the necessity to directly connect the systems via a communication line or an external input apparatus can be eliminated, improving the handling facility of the invention.

In order to achieve the fourth object, the questionnaire system is preferably arranged so that the questionnaire reply-gathering system gathers the reply data while giving an identifying symbol of the replier. Furthermore, the questionnaire totalizing and analyzing system performs totalizing and analyzing processes by using reply data to which the identifying symbol is given. As a result, the data accuracy can be improved in comparison to the accuracy realized by the conventional structure. In addition, the questionnaire result can be analyzed for a variety of data, such as the output of the questionnaire analysis result or the replier retrieval.

BRIEF DESCRIPTION OF THE DRAWINGS

FIG. 1 is an overall structural view illustrating a questionnaire system according to the present invention;

FIG. 2 is a flowchart schematically illustrating the process performed by the questionnaire system according to one embodiment of the present invention;

FIG. 4 illustrates the storage format about questionnaire data for a memory card;

FIG. 5 illustrates the storage format for questionnaire data in which reply data are registered;

FIG. 8 illustrates a menu frame for the questionnaire producing and aiding system;

FIG. 10 illustrates a menu frame for producing a questionnaire;

FIG. 12 illustrates a menu frame for producing the PR frame;

FIG. 14 illustrates a menu frame for producing print information;

FIG. 15 illustrates an example of a print output of print information;

FIG. 17A illustrates a menu frame for producing a questionnaire;

FIG. 17B illustrates the contents of an example of a questionnaire to which a limited condition is given;

FIG. 18 is a flowchart illustrating the contents of a data combining process;

FIG. 19A illustrates an initial frame at the data combining process;

FIG. 19B illustrates a frame of an example of data input at the data combining process;

FIG. 20 is a flowchart illustrating the contents of a question master file editorial process;

FIG. 21 illustrates a menu frame for a question master file editorial process;

FIG. 22 is a flowchart illustrating the process of an auxiliary function;

FIG. 23 illustrates a menu frame for the auxiliary function;

FIGS. 25A-25B are a flowchart illustrating the detailed process of a questionnaire reply-gathering operation;

FIG. 28 illustrates a menu frame for the questionnaire totalizing and analyzing process;

FIG. 29 illustrates an example of a totalization table;

FIG. 30A illustrates a frame of a displayed list of a file with which a cross table can be produced;

FIG. 30B illustrates an example of a frame with which a cross item is selected;

FIG. 31 illustrates an example of a cross table;

FIG. 32 illustrates an example of a totalization table plus a cross table;

FIG. 33 illustrates an example of a list for each individual questionnaire;

FIG. 35A illustrates a menu frame for a process of condition-retrieving the results of the reply;

FIG. 35B illustrates an example of a data input frame in the condition-retrieval of reply outcome; and FIG. 36 illustrates an example of the output of the condition-retrieval result.

DETAILED DESCRIPTION OF THE PREFERRED EMBODIMENTS

Figure 3A:
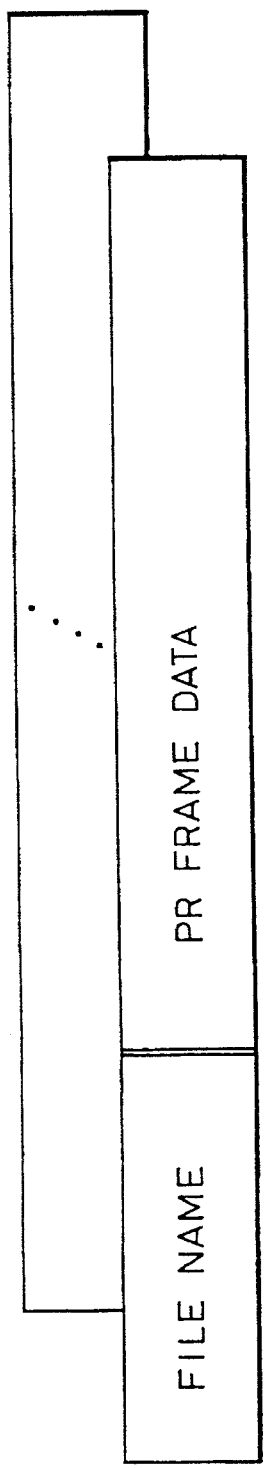
FIG. 3A illustrates a format for PR frame data.

FIG. 1 illustrates the overall structure of a preferred embodiment of a questionnaire system according to the present invention. FIG. 2 is a flowchart illustrating the contents of a process performed by the questionnaire system schematically shown in FIG. 1.

As shown in FIG. 1, the questionnaire system includes a questionnaire producing and aiding system 1, the main component of a computer A3, a questionnaire reply-gathering system 2, the main component of a computer A8, a questionnaire totalizing and analyzing system 3, the main component of a computer A12, and memory cards A5 and A11 for use as media for transmitting data between the questionnaire producing and aiding system 1 and the questionnaire reply-gathering system 2, and between the questionnaire reply-gathering system 2 and the questionnaire totalizing and analyzing system 3. Preferably, the memory cards A5 and A11 comprise IC cards.

The questionnaire producing and aiding system 1 includes the computer A3 which constitutes a questionnaire producing and aiding apparatus, a display A1 connected to the computer A3, a keyboard A2, a memory A4 including a hard disk HD, and a printer A14. The computer A3 is arranged to operate according to a program which includes a questionnaire producing and aiding program B1. Although omitted from illustration, the computer A3 has connectors to which a flexible disk (FD) A16 and the memory card A5 are connected.

The questionnaire reply-gathering system 2 comprises the computer A8, a display A6 connected to the computer A8, a keyboard A7 and a printer A17. The computer A8 is arranged to operate in accordance with a program including a questionnaire data-gathering program B2. Although omitted from the illustration, the computer A8 includes connectors to which the memory cards A5 and A11 are respectively connected. The questionnaire reply-gathering system 2 preferably comprises a portable personal computer. As a result, the questionnaire reply-gathering system 2 can be relocated to any arbitrary place to respond to the questionnaire.

The questionnaire totalizing and analyzing system 3 comprises the computer A12, a display A9, a keyboard A10 and a memory A12 which employs a hard disk (HD) and a printer A15. The computer A12 is arranged to operate in accordance with a program including a questionnaire data-analyzing program B3. Although omitted from the illustration, the computer A12 has a connector to which the memory card A11 is connected.

By the system as constituted above, the processes in steps 1–3 of FIG. 2 are continuously or individually performed. The basic process of each of steps 1–3 will be described next.

Step 1

An operator for producing the questionnaire starts the questionnaire producing and aiding program B1. The operator then inputs data for the questionnaire and performs required editorial operations while manipulating the keyboard A2 in a dialog manner in which the display A1 and the keyboard A2 are used. The questionnaire is, for example as shown in FIG. 17B, composed of one or a plurality of combinations of questions and replies (hereinafter called "questionnaire elements"). One questionnaire element comprises at least a question and a plurality of reply choices corresponding to the question. Furthermore, limitation conditions are included, if necessary.

A primary feature of the present invention is to produce questionnaire elements which are common to a variety of questionnaires in advance, and to store them in a questionnaire master file of a memory A4 in accordance with a predetermined format. The common questionnaire element is exemplified by question Q1 of FIG. 17B: "What do you belong to?" Reply choices to this question include "1. Elementary school, 2. Junior high school . . . , 5. Full-fledged member of society." This embodiment is further characterized in that data for producing the questionnaire which has been previously produced is stored in the above-described questionnaire master file similarly to the file for the questionnaire element.

The questionnaire producing and aiding program B1 enables a required questionnaire element or the file of the questionnaire to be read from the question file and to be copied in response to a demand from the operator for producing the questionnaire. As a result, the operator can easily produce a novel questionnaire by an editorial operation such as utilizing the copied questionnaire items or the entire questionnaire, and by partially changing it. A plurality of the above questionnaires can be produced according to the present invention.

In response to an instruction issued from the operator, the questionnaire producing and aiding program B1 causes data (hereinafter called "questionnaire data" or "questionnaire sheet data"), which constitutes the produced questionnaire, to be stored in the memory A4 in accordance with a format shown in FIG. 3C.

Figure 3B:
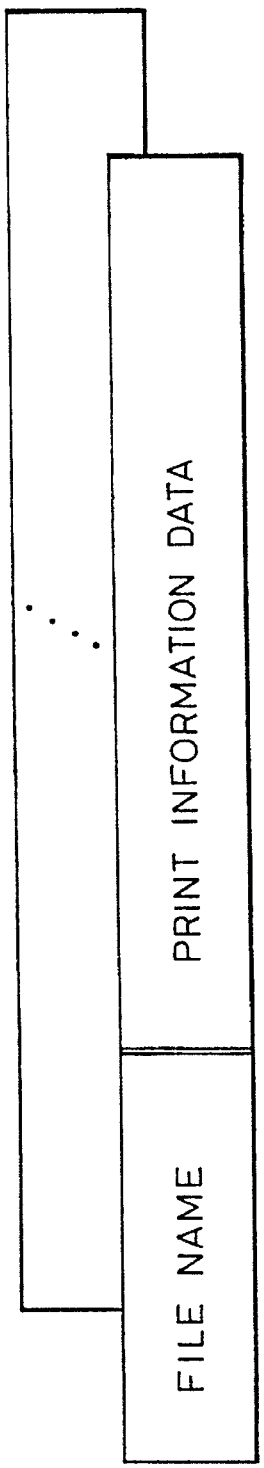
FIG. 3B illustrates a format for print information.

The questionnaire producing and aiding system 1 enables, in addition to questionnaire, frame data for a PR frame, print information data for printing out a service ticket and the like to be produced as described later. Similarly to the questionnaire data, the above-described PR frame data and print information data are stored in the memory A4 in accordance with data formats shown in FIGS. 3A, 3B.

In response to the command issued from the operator, the questionnaire producing and aiding system 1, as needed, combines one of a plurality of questionnaire data items stored in the memory A4 and the PR frame data, print data, and the like to produce questionnaire data before the produced questionnaire data are stored in the memory card A5 in accordance with a format shown in FIG. 4.

The produced questionnaire can be printed out by the printer A14. The printed questionnaire can be used in the questionnaire-gathering operation in a conventional case in which a questionnaire is filled out by hand while eliminating the need to use the questionnaire reply-gathering system 2.

Step 2

The questionnaire reply-gathering program B2 will start when the person replying to the questionnaire connects the memory card A5 to a predetermined connector (slot) of the computer A8 and turns on the power. That is, an automatic starting OS (Operating System) is included in the memory card A5 to enable a person who is unfamiliar with the operation of the computer to use it easily. Therefore, by simply turning on the power, the questionnaire reply-gathering program B2 can be started.

As a result, the questionnaire reply-gathering program B2 reads the questionnaire data from the memory card A5 to display the questionnaire on the display A6. The respondent to the questionnaire responds in a dialog in which the display A6 and the keyboard A7 are used to operate the reply-gathering program B2. Thus, replies to the questions are input.

The questionnaire reply-gathering program B2 gathers the reply data. Then, the gathered reply data are stored in the memory card A11 as a reply data file, in accordance with a format as shown in FIG. 5. The difference between the format shown in FIG. 4 and that shown in FIG. 5 lies in that reply data collected from n persons are stored in the area of the questionnaire reply data.

Step 3

The questionnaire totalizing and analyzing program B3 is activated by operating the keyboard A10. The operator inserts the memory card A11 into a predetermined connector before the operator operates the keyboard A10 according to a dialog in which the display A9 and the keyboard A10 are used so that the reply data file is read out from the memory card A11. Then, the display A9 and the keyboard A10 become input/output devices, and the questionnaire totalizing and analyzing program B3 can be operated. As a result, reply data required to analyze the replies to the questionnaire are totalized or required operations or the like are performed in the dialog method so that the replies are analyzed. Data gathered from the replies and analyzed are stored as an analysis data file in the memory A13 in accordance with a format shown in FIG. 6. Furthermore, the structure is arranged so that required data can be printed out by the printer A15.

In particular, demographic data about the respondent (for example, name, identification symbol, age, name of company, etc.) are preferably entered in the questionnaire or the reply. Thus, the questionnaire reply,gathering system 2 enables individual personal data to be gathered. Therefore, a versatile questionnaire analysis can be performed by utilizing the questionnaire totalizing and analyzing system 3 while establishing specific personal data of the respondent as retrieval terms. For example, a questionnaire analysis can be performed based on data such as "replier", "question replied" and "contents of the reply".

The structure of the system shown in FIG. 2 may be arranged so that elements constituting the questionnaire producing and aiding system 1 and the questionnaire totalizing and analyzing system 3, such as the computers A3 and A12, the displays A1 and A9, the keyboards A2 and A10, and the memories A4 and A13, respectively, are replaced by common devices.

Although the memory card A5 and the memory A11 have been described as being individually provided, one card may commonly be used for both.

In addition, if a plurality of the questionnaire reply-gathering systems 2 are used, the questionnaire can simultaneously be conducted at a plurality of places. In this case, a plurality of memory cards A5 and memory cards A11 are prepared to correspond to the number of sets of the questionnaire reply-gathering system 2.

Next, the function of each of the questionnaire producing and aiding system 1, the questionnaire reply-gathering system 2 and the questionnaire totalizing and analyzing system 3 will be described.

I. Questionnaire Producing and Aiding System 1

Figure 7:
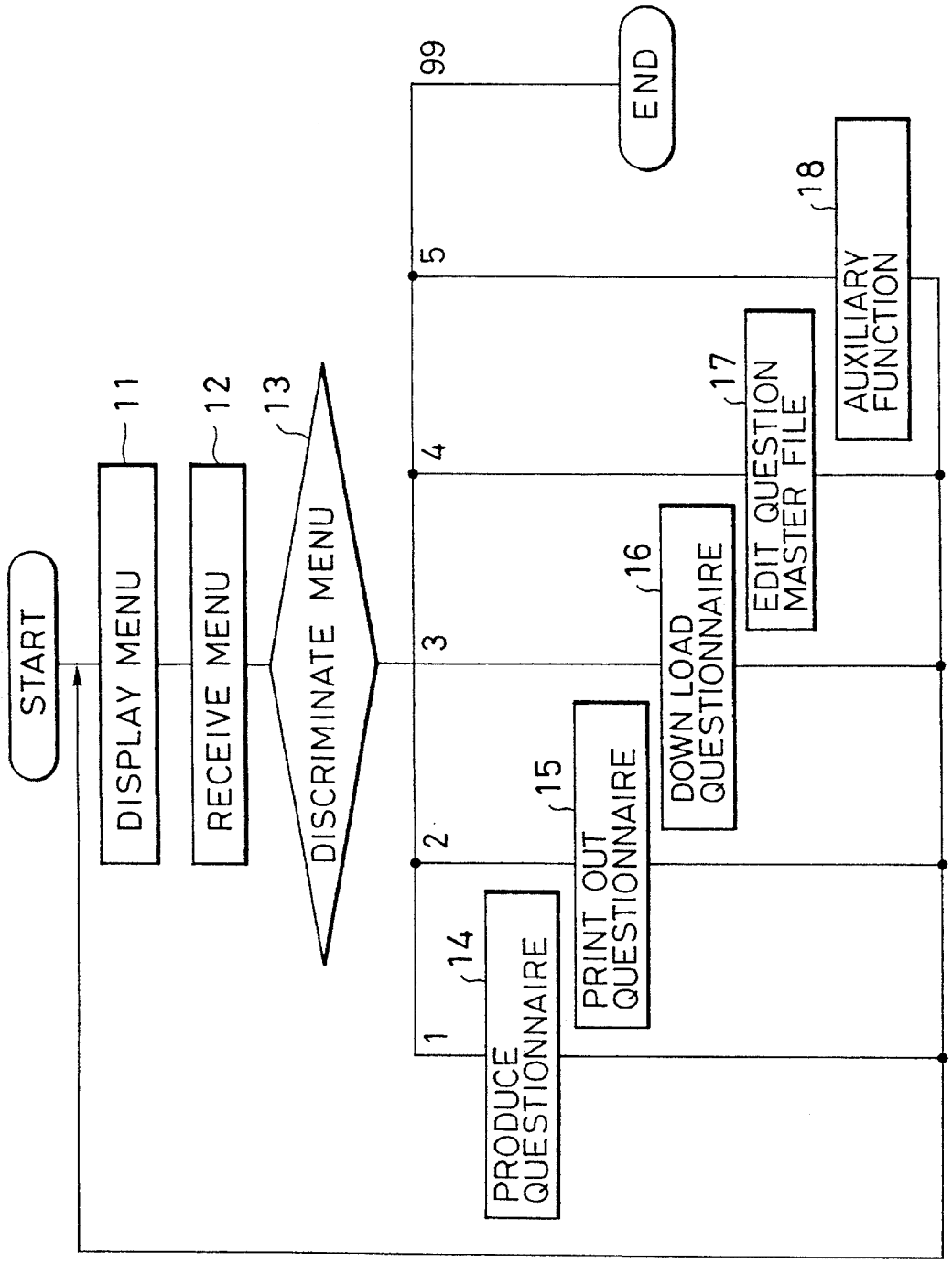
FIG. 7 is a flowchart which schematically illustrates a process to be performed by a questionnaire producing and aiding system.

The function of the questionnaire producing and aiding system 1 will now be described with reference to FIGS. 7–24. FIG. 7 is a flowchart which schematically illustrates the function of the questionnaire producing and aiding system 1.

Step 11

When the questionnaire producing and aiding system 1 is started, a menu frame shown in FIG. 8 is displayed on the display A1.

Step 12

The operator selects a menu item in the menu frame and inputs the number of a menu discriminator by manipulating the keyboard A2 so that the menu receipt is executed.

Step 13

The menu item supplied from the keyboard A2 is discriminated.

Step 14

If the menu discriminator is "1", the flow proceeds to a questionnaire-producing menu, a PR frame-producing menu, a print information-producing menu and the like shown in FIGS. 9–19 so that the production of the questionnaire or the like is aided by operations which will be described later.

Step 15

If the menu discriminator is "2", the questionnaire produced in Step 14 is printed out as a questionnaire sheet.

Step 16

If the menu discriminator is "3", the questionnaire data produced in Step 14 are stored (downloaded) in the memory card A5.

Step 17

If the menu discriminator is "4", the question master file stored in the memory A4 is controlled as shown in FIGS. 20 and 21.

Step 18

If the menu discriminator is "5", auxiliary functions such as copying and deleting of the questionnaire data produced in Step 14 and question master file produced in Step 17 will be started.

If the menu discriminator is "99", the process performed by the questionnaire producing and aiding system 1 is completed.

Next, each step performed by the questionnaire producing and aiding system shown in FIG. 7 will be described with reference to FIGS. 9–23.

(1) Producing of Questionnaire

Figure 9:
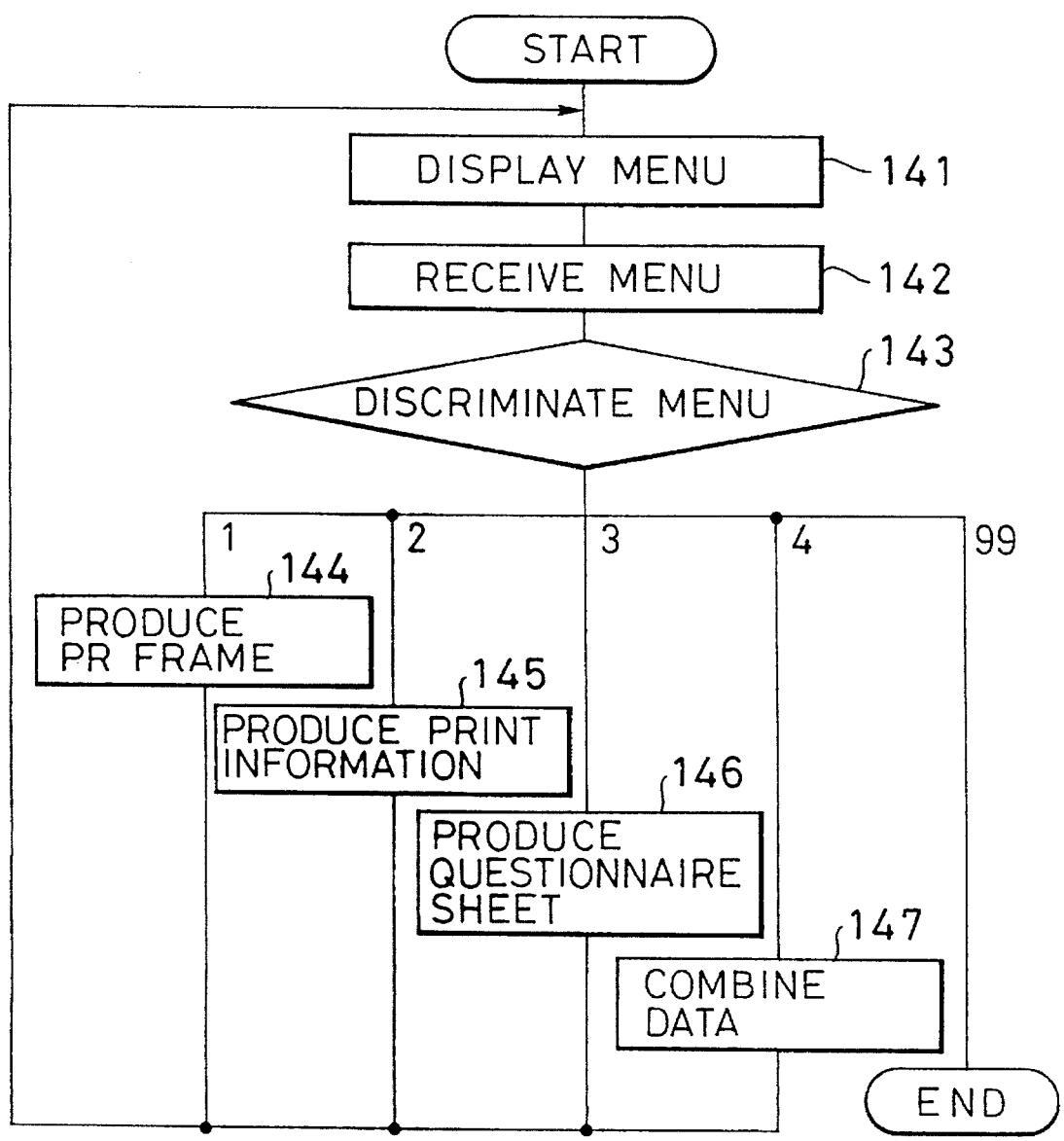
FIG. 9 is a flowchart illustrating a questionnaire producing process.

When the questionnaire-producing process shown in Step 14 of FIG. 7 is selected, the process is performed in accordance with a flow chart shown in FIG. 9.

First, the questionnaire-producing menu frame shown in FIG. 10 is displayed on the display A1 in Step 141.

Then, when the number of the menu discriminator of the menu frame shown in FIG. 10 is selected and input from the keyboard A2, the menu receipt is performed in Step 142.

In Step 143, a menu item input from the keyboard A2 is discriminated.

If the menu discriminator is "1", a process for producing the PR frame, to be displayed on the display A6 of the questionnaire reply-gathering terminal system 2 at the time of conducting the questionnaire, is aided. The "PR frame" is a frame which is initially displayed on the display A6 of the questionnaire reply-gathering terminal system 2 at the time of conducting the questionnaire. The PR frame includes the title and the object of the questionnaire. Since a variety of facts can be publicized, the term PR frame is used.

(i) Producing of PR Frame

Figure 11:
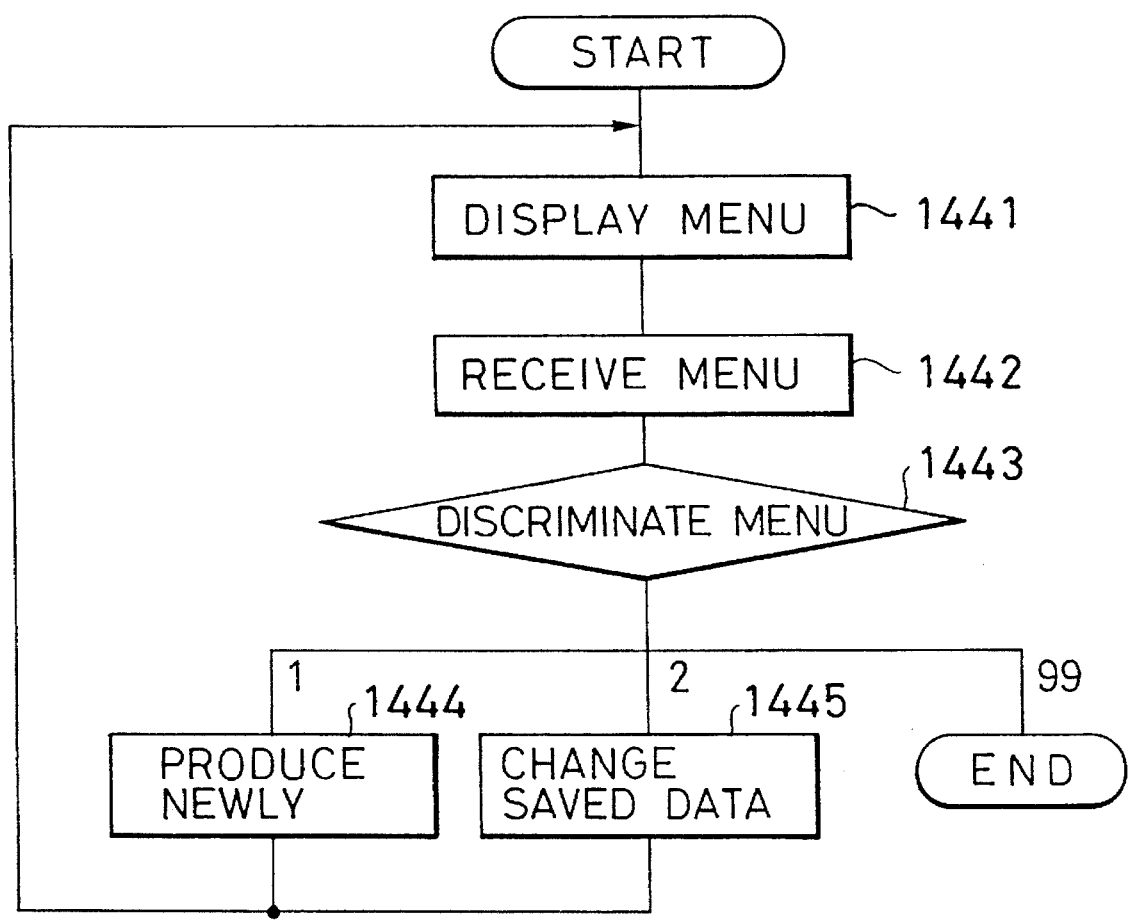
FIG. 11 is a flowchart illustrating a PR frame producing process.

FIG. 11 illustrates a flowchart for a process of producing the PR frame. FIG. 12 illustrates a menu of the PR frame-producing process.

First, a menu frame for the PR frame-producing process is displayed on the display A1 in Step 1441.

Then, in Step 1442, when the number of a menu discriminator of the menu frame shown in FIG. 12 is input from the keyboard A2 in accordance with a selection made by the operator, the menu receipt is executed.

In Step 1443, the received menu item is discriminated.

If the menu discriminator is "1", the flow proceeds to Step 1444 in which a novel operation for producing the PR frame is executed. That is, the operator newly-produces data for the PR frame while making the display A1 and the keyboard A2 to be the input/output devices, and while looking at the contents displayed on the display A1 in a dialogue manner. For example, the PR frame is arranged to show information such as "the title of the questionnaire", "object of the questionnaire", "request for replying to the questionnaire" and "public relation of a product". The produced PR frame data are, as described above, stored in the memory A4 in accordance with the data format shown in FIG. 3A.

If the menu discriminator is "2" the flow proceeds to step 1445 in which a PR frame data item, which has been previously produced and stored in the memory A4, is called so as to update it. As a result, producing of the PR frame is aided. Therefore, the updated PR frame data are, similarly to the case of the new producing operation, stored in the memory A4 in accordance with the data format shown in FIG. 3A.

If the menu discriminator is "99", the PR frame producing process in step 144 is completed and the flow returns to the menu frame displaying operation in step 141.

(ii) Producing of Print Information

In a case where menu discriminator "2" is selected on the menu frame, the flow proceeds to step 145 shown in FIG. 9 in which messages are produced to be printed out from the printer A17 of the questionnaire reply gathering system 2 so as to be given to the questionnaire replier. A message may comprise information about a service ticket having added value to be given to the replier of the questionnaire in reward for the reply.

Figure 13:
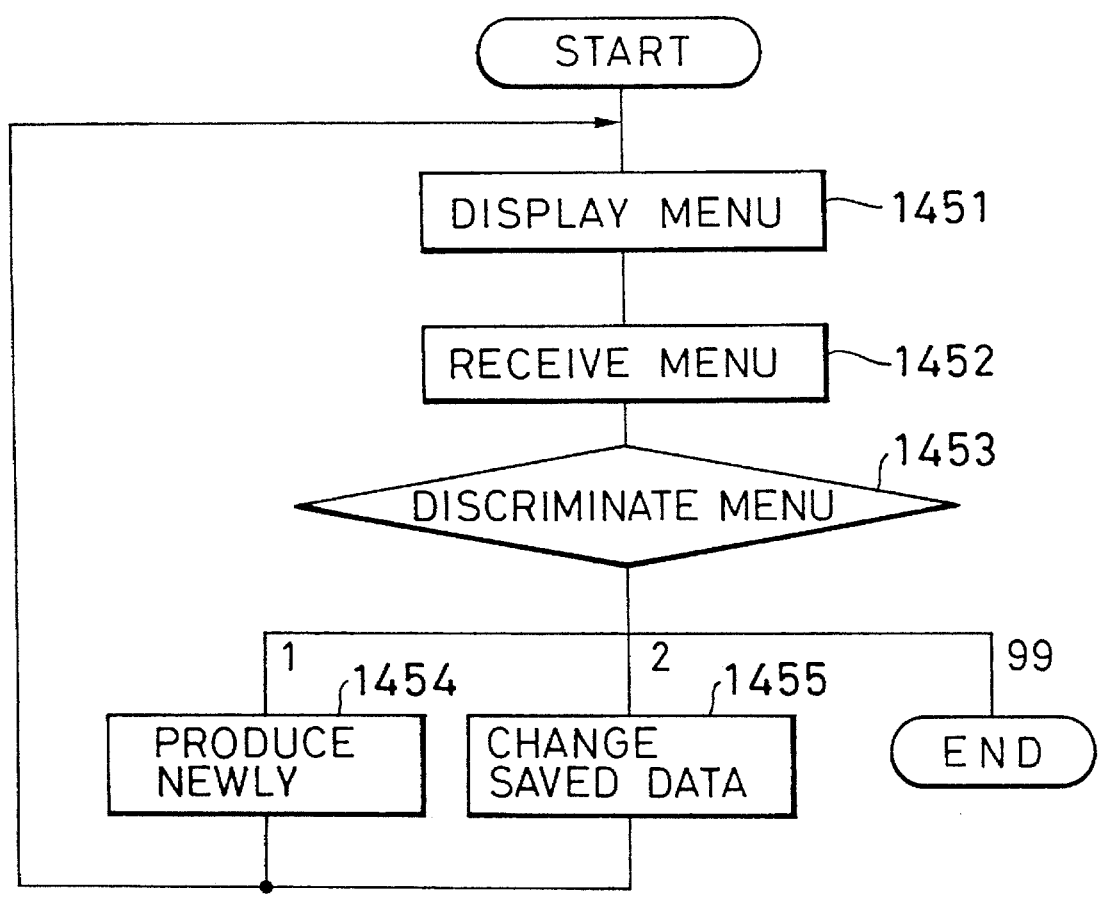
FIG. 13 is a flowchart illustrating the print information processing operation.

FIG. 13 is a flow chart for producing print information. FIG. 14 illustrates a menu frame for producing print information.

First, the menu frame for producing print information shown in FIG. 14 is displayed on the display A1 in step 1451.

Then, in step 1452, when the number of a menu discriminator on the menu frame shown in FIG. 14 is input from the keyboard A2 in accordance with the selection made by the operator, the menu receipt is executed.

In step 1453, the received menu item is discriminated.

If the menu discriminator is "1", the flow proceeds to step 1454 in which a new operation for producing print information is executed. That is, the operator newly produces print information while making the display A1 and the keyboard A2 to be the input/output devices, and while looking at the contents displayed on the display A1 in a dialogue manner. FIG. 15 illustrates an example of print information produced. The produced print information data are, as described above, stored in the memory A4 in accordance with the data format shown in FIG. 3B.

If the menu discriminator is "2", the flow proceeds to step 1455 in which a print information data item, which has been previously produced and stored in the memory A4, is called so as to update it. As a result, producing of the print information is aided. Therefore, the updated print information data are, similarly to the case of the new producing operation, stored in the memory A4 in accordance with the format shown in FIG. 3B.

If the menu discriminator is "99", the print information input process is completed and the flow returns to the process shown in FIG. 9 so that the menu frame shown in FIG. 10 is displayed.

(iii) Producing of Questionnaire

In a case where menu discriminator "3" is selected on the menu frame shown in FIG. 10, the flow proceeds to step 146 shown in FIG. 9 in which the questionnaire processing operation is executed.

Figure 16:
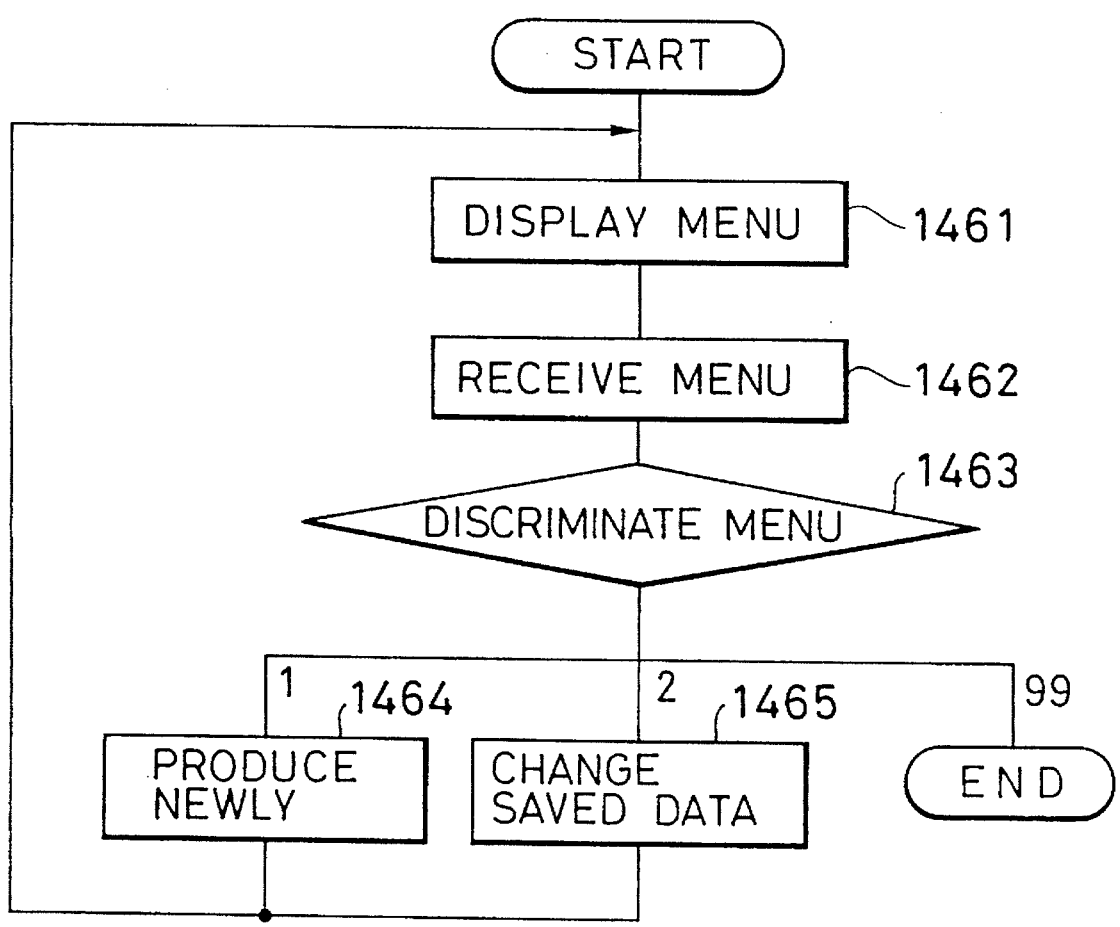
FIG. 16 is a flowchart illustrating a questionnaire-producing operation.

FIG. 16 is a flow chart for the questionnaire producing process. FIG. 17A illustrates a menu frame for the questionnaire producing process.

First, the menu frame for the questionnaire producing process shown in FIG. 17A is displayed on the display A1 in step 1461.

Then, in step 1462, when the number of a menu discriminator of the menu frame shown in FIG. 17A is input from the keyboard A2 in accordance with the result of a selection made by the operator, the menu receipt is executed.

In step 1463, the received menu item is discriminated.

If the menu discriminator is "1", the flow proceeds to step 1464 in which a new operation for producing the questionnaire element composed of the question, the reply choice and the reply limitation condition and the like is executed. As a result, the operator newly produces a questionnaire sheet while making the display A1 and the keyboard A2 to be the input/output devices, and while looking at the contents displayed on the display A1 in a dialogue manner.

Figure 6:
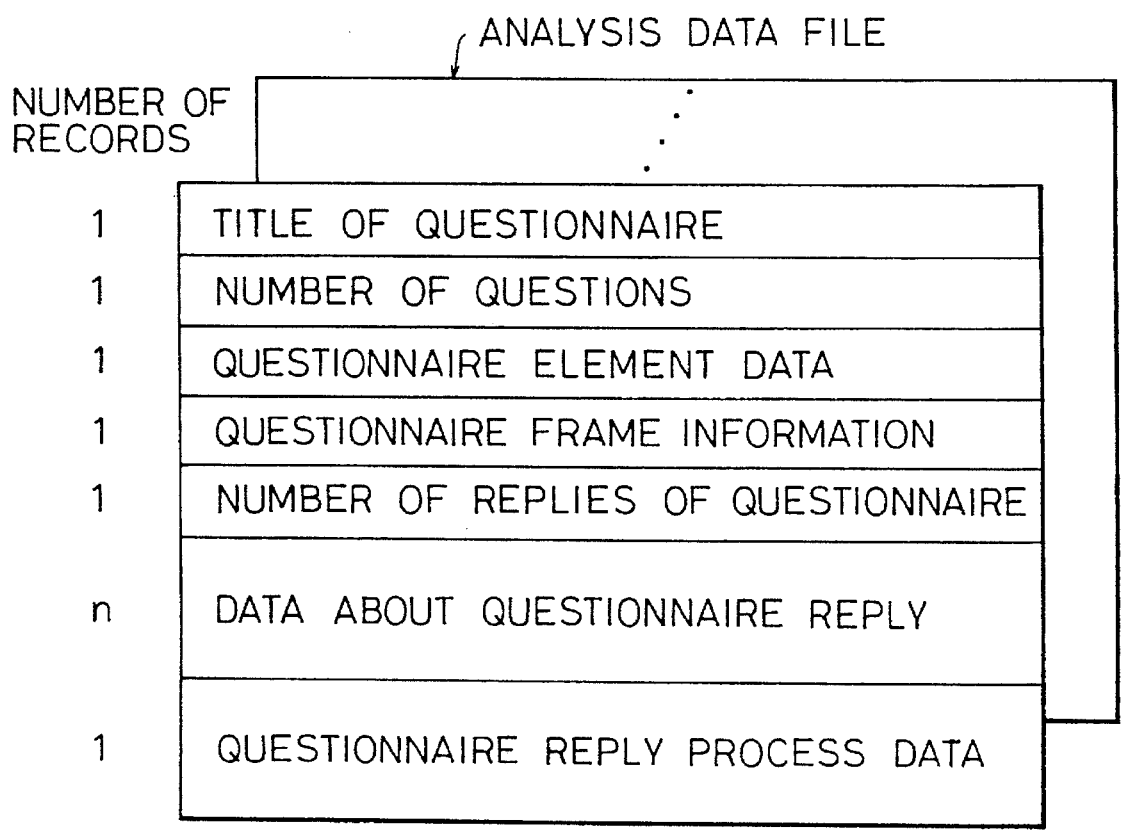
FIG. 6 illustrates the storage format for questionnaire analysis data.

FIG. 17B illustrates a portion of an example of the produced questionnaire sheet and the displayed frame. The contents of the questionnaire sheet are, as shown in FIG. 6, composed of the title of the questionnaire, the number of questions, the questionnaire element, the position, and the color of the display of the questionnaire sheet on the display. For example, the questionnaire consists of, as illustrated in FIG. 17B, Q1 "What do you belong to?" reply choices "1. Elementary school, 2. Junior high school, 3. High school, 4. College, 5. Full-fledged member of society", and a reply limitation condition. The reply condition which limits a choice of reply comprises a condition for selecting the single answer or the multi-answer and a condition with which switching to a limited question is made in a case where the replier has selected a specific reply choice at the previous question.

In a case where the questionnaire is conducted in step 1464, the question master file in the memory A4 is called and files are, in available questionnaire element units, selected from one or a plurality of questionnaire elements, which have been previously stored, to copy the files so as to be utilized in a newly produced questionnaire sheet. As a result, the labor of producing the questionnaire sheet can be significantly reduced. The thus-produced questionnaire sheet data are stored in the memory A4 in accordance with the data format shown in FIG. 3C.

If the menu discriminator is "2", the flow proceeds to step 1465 in which a questionnaire sheet data item, which has been produced and stored in the question master file in the memory A4, is called so as to be updated. As a result, a desired questionnaire sheet is produced easily. Since the questionnaire is usually conducted in such a manner that a portion of the questions is commonly used and a questionnaire of a similar type which has been conducted previously can be utilized by needing only to change its contents by a small degree, the efficiency can be significantly improved by utilizing the data which have been produced in comparison to a case of producing a completely new questionnaire. Furthermore, when the files in the questionnaire element units are copied to utilize them in the updating process as described above, the producing efficiency can further be improved. The updated questionnaire sheet data are stored in the memory A4 in accordance with the format shown in FIG. 3C similarly to the above-described case of the novel producing operation.

If the menu discriminator is "99", the questionnaire processing operation is completed and the flow returns to the menu frame display in step 141 as shown in FIG. 9.

(iv) Combination of Questionnaire Data

If menu discriminator "4" is selected on the menu frame shown in FIG. 10, a data combining process is executed in step 147 as shown in FIG. 9. The above is a process in which the PR frame data produced in step 144 as shown in FIG. 9, the print information data produced in step 145 and the questionnaire sheet data produced in step 146 are combined with one another so as to produce a set of data items (questionnaire data) required to conduct the questionnaire.

FIG. 18 is a flow chart for the data combining process. FIG. 19 illustrates a frame for the data combining process.

First, in step 1471, the initial frame for the data combining process shown in FIG. 19A is displayed on the display A1.

Then, in step 1472, when a function key is depressed on the key board A2 corresponding to each process in the operation frame shown in FIG. 19A, the receipt of the process is executed.

In step 1473, the received process item is discriminated.

If a key input of "F1" is made, the file list of PR frame data stored in the memory A4 is displayed on the frame in step 1474. When the operator then selects a required file name (for example, TEST81), the selected file is read as shown in FIG. 19B. In a case where the PR frame can be omitted from the display, an instruction of "unnecessary" is input as the print information shown in FIG. 19B. As a result, the PR frame data are omitted from the questionnaire data.

If a key input of "F2" is made, the file list of print information data stored in the memory A4 is displayed on the frame. When the operator then selects a required file name, the selected file is read. FIG. 19B illustrates a case in which "unnecessary" is input.

If a key input of "F3" is made, the file list of the questionnaire data stored in the memory A4 is displayed on the frame in step 1475. When the operator then selects a required file name (for example, TEST81), the selected file is read.

If key "F8" is selected, the PR frame data, print information data and questionnaire sheet data selected in the above-described processes are combined with one another so that a data set composing the questionnaire data is produced. When the above-described process is completed, the flow returns to step 141 as shown in FIG. 9 and then the menu frame shown in FIG. 10 is displayed.

If the menu discriminator is "99" in the discriminating process in step 143, as shown in FIG. 9, the questionnaire producing process in step 14, as shown in FIG. 7, is completed before the flow returns to step 11 in which the menu frame as shown in FIG. 8 is again displayed.

(2) Printing of Questionnaire Sheet

If menu discriminator "2" is selected on the menu frame shown in FIG. 8, the questionnaire sheet printing process in step 15, as shown in FIG. 7, is executed. First, a file listing the data is composed of the questionnaire data produced in the questionnaire producing process is displayed on the display A1. When the operator selects questionnaire data to be printed, the document is printed out by the printer A14. After the above-described process has been completed, the flow returns to step 11 in which the menu frame shown in FIG. 8 is displayed.

(3) Downloading of Questionnaire Data

When menu discriminator "3" is selected on the menu frame shown in FIG. 8, an operation of downloading the questionnaire data in step 16, as shown in FIG. 7, is executed. First, a file list concerning a set of the questionnaire data produced in the questionnaire process is displayed on the display A1. Then, the memory card A5 is set to a predetermined connector of the computer A3 before the operator selects a data set composed of questionnaire data from the above-described list to download the data set. As a result, the selected data set of the questionnaire data is downloaded to the memory A5 in accordance with the data format shown in FIG. 4. After the above-described process has been completed, the memory card A5 is ejected from the computer A3. Then, the flow returns to step 11 in which the menu frame, as shown in FIG. 8, is displayed.

(4) Edition of Question Master File

When menu discriminator "4" is selected on the menu frame shown in FIG. 8, a process of editing a question master file in step 17, as shown in FIG. 7, is executed. The question master file editorial operation is a process in which the questionnaire elements, which are frequently used at the time of the questionnaire producing process, are, as described above, produced and registered to be controlled.

FIG. 20 illustrates a flow chart for the question master file editorial process. FIG. 21 illustrates a menu frame for use in the question master file editorial operation.

When menu discriminator "4" is selected on the menu frame shown in FIG. 8, the menu frame for use in the question master file editorial process, as shown in FIG. 21, is displayed on the display A1 in step 171 as shown in FIG. 20.

When the operator selects a menu item from the menu frame displayed on the display A1 and inputs it by using the keyboard A2, the menu receipt is executed in step 172. In step 173, the menu item input by using the keyboard A2 is discriminated.

Figure 3C:
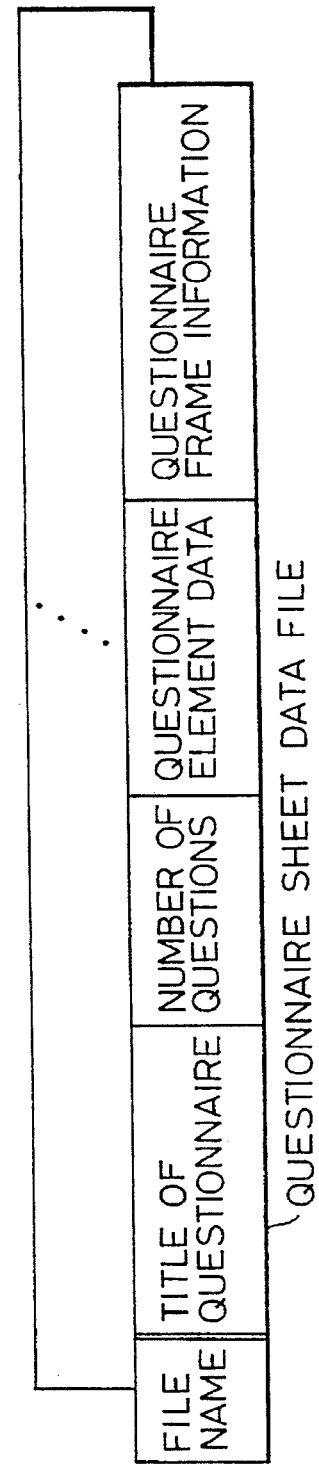
FIG. 3C illustrates a format for questionnaire sheet data.

If the menu discriminator is "1", the flow proceeds to step 174 in which the operator produces the file for the questionnaire sheet data by utilizing the display A1 and the keyboard A2 as the input and output devices in accordance with the data format shown in FIG. 3C so as to register the file as a question master file in the memory A4. As described above, the questionnaire sheet data are constituted by the questionnaire elements such as the title of the questionnaire, the number of the questions, the questions, the reply choices, and the like.

When the menu discriminator is "2", the operator calls the file of the questionnaire sheet data which has been previously produced from the question master file by using the display A1 and the keyboard A2 as the input and output devices so as to update the file in a dialogue manner in step 175. The updated file of the questionnaire sheet data is stored in the memory A4.

If the menu discriminator is "3", the operator calls the file of the questionnaire sheet data which has been previously produced from the question master file by using the display A1 and the keyboard A2 so as to select a required file whose contents are to be printed in a dialogue manner.

If the menu discriminator is "4", the operator, in step 177, utilizes the display A1 and the keyboard A2 in a dialogue manner to select an unnecessary file from the question master file to delete the file.

If the menu discriminator is "99", the question master file editorial process in step 17 is completed and the menu frame is displayed in step 11.

(5) Auxiliary Function

When menu discriminator "5" is selected on the menu frame shown in FIG. 8, an auxiliary function process in step 18, as shown in FIG. 7, is executed. FIG. 22 is a flow chart which illustrates the contents of the auxiliary function. FIG. 23 illustrates a menu frame for the auxiliary function.

In step 181 shown in FIG. 22, the menu frame for the auxiliary function shown in FIG. 23 is displayed on the display A1. When the operator selects a menu item from the menu frame display on the display A1 and inputs the menu item by using the keyboard A2, the menu receipt is performed in step 182. In step 183, the menu item input by the keyboard A2 is discriminated.

If the menu discriminator is "1", the operator utilizes the display A1 and the keyboard A2 as the input and output devices in a dialogue manner to copy each file of the PR frame data, the print information data, the questionnaire sheet data and questionnaire data, and the contents of the question master file from the memory A4 of a hard disk to the flexible disk (FD) A16 in step 184.

If the menu discriminator is "2", the operator utilizes the display A1 and the keyboard A2 as the input and output devices in a dialogue manner to copy each file of the PR frame data, the print information data, the questionnaire sheet data and questionnaire data, and the contents of the question master file from the flexible disk (FD) A16 to the memory A4 in step 185.

If the menu discriminator is "3", the operator utilizes the display A1 and the keyboard A2 as the input and output devices in a dialogue manner, to retrieve an unnecessary file from files of the PR frame data, the print information data, the questionnaire sheet data and questionnaire data, and the question master file stored in the memory A4, and to delete the unnecessary file in step 186.

If the menu discriminator is "4", the operator utilizes the display A1 and the keyboard A2 as the input and output devices in a dialogue manner to retrieve an unnecessary file from files of the PR frame data, the print information data, the questionnaire sheet data and questionnaire data, and the question master file stored in the flexible disk (FD) A16, and to delete the unnecessary file in step 187.

If the menu discriminator is "5", the operator utilizes the display A1 and the keyboard A2 as the input and output devices, inserts the memory card A5 into a predetermined place of the computer A3 and initializes the memory card A5 in a dialogue manner to clear the memory card A5.

If the menu discriminator is "99", the auxiliary function in step 18, shown in FIG. 7, is completed and the flow returns to step 11 in which the menu frame is displayed as shown in FIG. 8.

II. Questionnaire Reply Gathering System

The questionnaire reply gathering system 2 for performing the process in step 2 shown in FIG. 1 will now be described with reference to FIGS. 24, 25A, 25B and 26.

Figure 24:
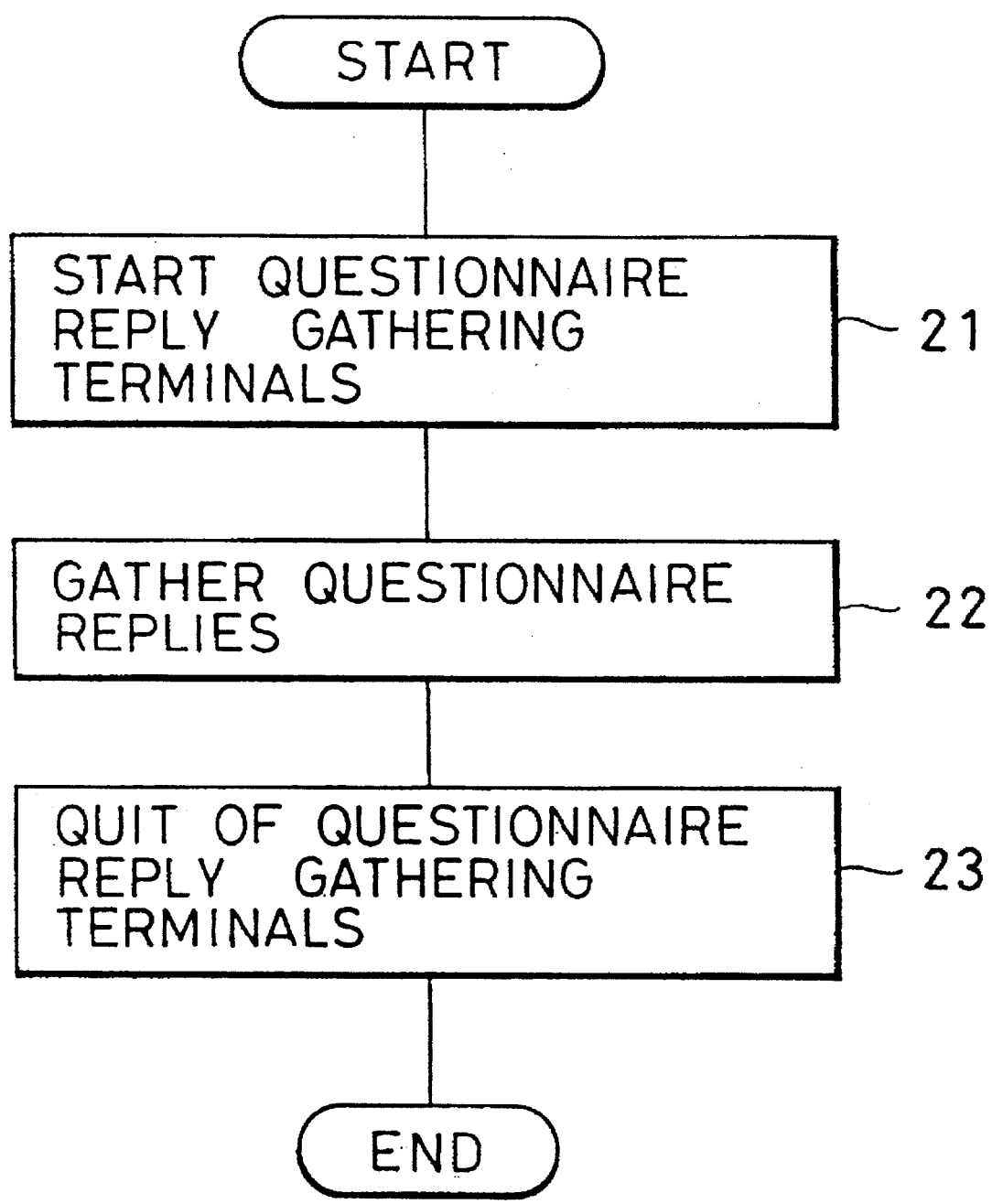
FIG. 24 is a flowchart illustrating the contents of a process to be performed by a questionnaire reply-gathering system.

FIG. 24 is a flow chart for the process to be performed by the questionnaire reply gathering system 2. In step 21, the memory card A5, in which the questionnaire data produced in the questionnaire producing and aiding system 1 are stored, is inserted into a predetermined slot of the personal computer of the questionnaire reply gathering terminal 2. Then, power for the computer A8 which constitutes the questionnaire reply gathering terminal apparatus is turned on so that the questionnaire data are read from the memory card A5. As a result, the questionnaire reply gathering program B2 is started. At this time, an automatic loading means, arranged to act in accordance with the OS program stored in the memory card, enables questionnaire data to be read from the memory card A5, only by turning on the power so that the questionnaire reply gathering program B2 is started.

Then, in step 22, the questionnaire reply gathering system 2 is used to gather reply data from the questionnaire repliers in the following sequence.

(6) Gathering of Questionnaire

FIGS. 25A and 25B are a flow chart which illustrates the process of gathering the questionnaire replies in step 22 as shown in FIGS. 25A–25B. When the questionnaire reply gathering program B2 is started, the PR frame is displayed on the display A6 in accordance with the PR frame data in step 2201. In the next step 2203, a discrimination is made as to whether or not the key input from the keyboard A7 is a "start key".

If a discrimination is made in step 2203 that the key, which has been input, is any one of the keys except for the "start key", the flow proceeds to step 2202 in which a result of the actual collection, that is, data about the number of replies from the start of the questionnaire reply gathering program B2 is displayed on the display A6 (step 2202). The actual collection data relate to the number of questionnaire replies shown in FIG. 5, which are held in the questionnaire reply gathering system 2. After the reply result has been displayed, the flow returns to step 2201 in which the PR frame is displayed.

If a discrimination is made in step 2203 that the key, which has been input, is the "start key", the flow proceeds to step 2204 in which the questionnaire is started. The questionnaire is conducted in a dialogue manner by utilizing the display A6 and the keyboard A7 as the input and output devices. First, in step 2205, input of the identification symbol (ID) of the replier of the questionnaire, for example a customer, is received. As an alternative to an arrangement in which the input of the ID is performed by the keyboard, another structure may be employed in which an ID card reader is provided for the questionnaire reply gathering system 2 to read the customer ID on the ID card.

After the input of the customer ID has been received, the questions, the reply choices and the required reply limitation condition are displayed on the display A6 in accordance with the questionnaire sheet data in step 2206.

In the next step 2207, a discrimination is made to find whether or not a predetermined completion time has passed. That is, the interval from the display of the question and the like on the display A6 to the operation of key-inputting the questionnaire reply is measured to discriminate whether or not the above-described interval exceeds the predetermined completion time. If a discrimination is made that the interval exceeds the completion time, all of the contents of the operations are cleared before the flow returns to step 2201 in which the PR frame is displayed.

In a case where the interval does not exceed the completion time, the question reply is input from the keyboard A7 and the above-described reply is received in step 2208. The validity of the reply is discriminated in step 2212. The above-described validity discrimination is performed in such a manner that the reply is not a proper answer if there is a contradiction, such as when a person has replied "house wife" in the question about occupation and "male" in the question about the distinction of sex. In a case where a discrimination is made that the reply is not proper, the flow proceeds to step 2206 in which the contents of the questions displayed on the display A6 are again displayed on the display A6 before the flow returns to step 2207 in which a reply is repeatedly requested. At this time, a structure may be employed in which the fact that the reply was made erroneously is notified to the questionnaire replier by displaying an error message on the display A6 or by making a buzzer sound.

The discrimination to be made in step 2212 includes a discrimination as to whether or not the limited reply including conditions has been selected. If a discrimination is made that the reply is the limited reply, skipping to the limited question instructed in accordance with the limitation condition is made in step 2210. For example, a person who selected "4" for question Q2 is caused to proceed to Q6. As described above, in a case where a reply is the limited reply "4" the skipping operation to limited question Q6 is performed and the processes from step 2206 are repeated.

In a case where a discrimination is made in step 2212 that the input reply is neither an erroneous reply nor a limited reply, the flow proceeds to step 2213 in which a discrimination is made as to whether or not the question displayed on the display A6 is the final question.

If a discrimination is made that-it is not the final question, the flow proceeds to step 2211 in which the reply process proceeds to the next question and the processes from step 2206 are repeated.

Figure 26:
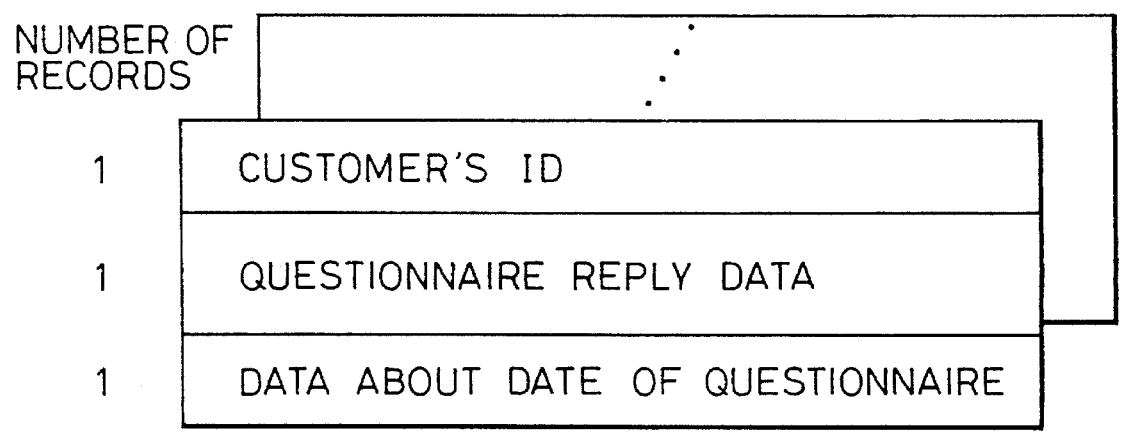
FIG. 26 illustrates a format for reply data.

If a discrimination is made that it is the final question, the flow proceeds to step 2214 in which the reply data are registered to the memory card A11 in accordance with the format shown in FIG. 5 and "1" is added to the "number of questionnaire replies". As shown in FIG. 26, the reply data to be registered in this step include "customer ID", "questionnaire time and day" and "reply data" which correspond to the question.

When the contents of the replies have been registered, the flow proceeds to step 2215 in which a discrimination is made as to whether or not the service ticket is issued. The discrimination of "issue" is made in accordance with a fact that the print information is included in the questionnaire data. In a case of "issue", the flow proceeds to step 2216 in which the service ticket is printed out by using the printer A17 in accordance with the print information data. In a case of no "issue" the flow proceeds to step 2217 in which a discrimination is made as to whether or not the questionnaire replier is the final replier.

The discrimination as to whether or not the replier is the final replier is made in step 2217 in such a manner that a questionnaire conducting time is previously set and the final replier is discriminated in accordance with a fact that the set time has passed or the number of the questionnaire repliers is previously set. In a case where a discrimination is made in step 2217 that the replier is not the final replier, the processes from the display of the PR frame to be made in step 2201 are repeated. In a case where the replier is the final replier, the questionnaire reply gathering process is completed.

After the above-described processes have been completed, the memory card A11 inserted into the questionnaire reply gathering system 2 is ejected before the power for the questionnaire reply gathering system 2 is switched off. Thus, the process is completed.

III. Questionnaire Totalizing and Analyzing System 3

The process to be performed by the questionnaire totalizing and analyzing system 3 in step 3 shown in FIG. 1 will now be described.

Figure 27:
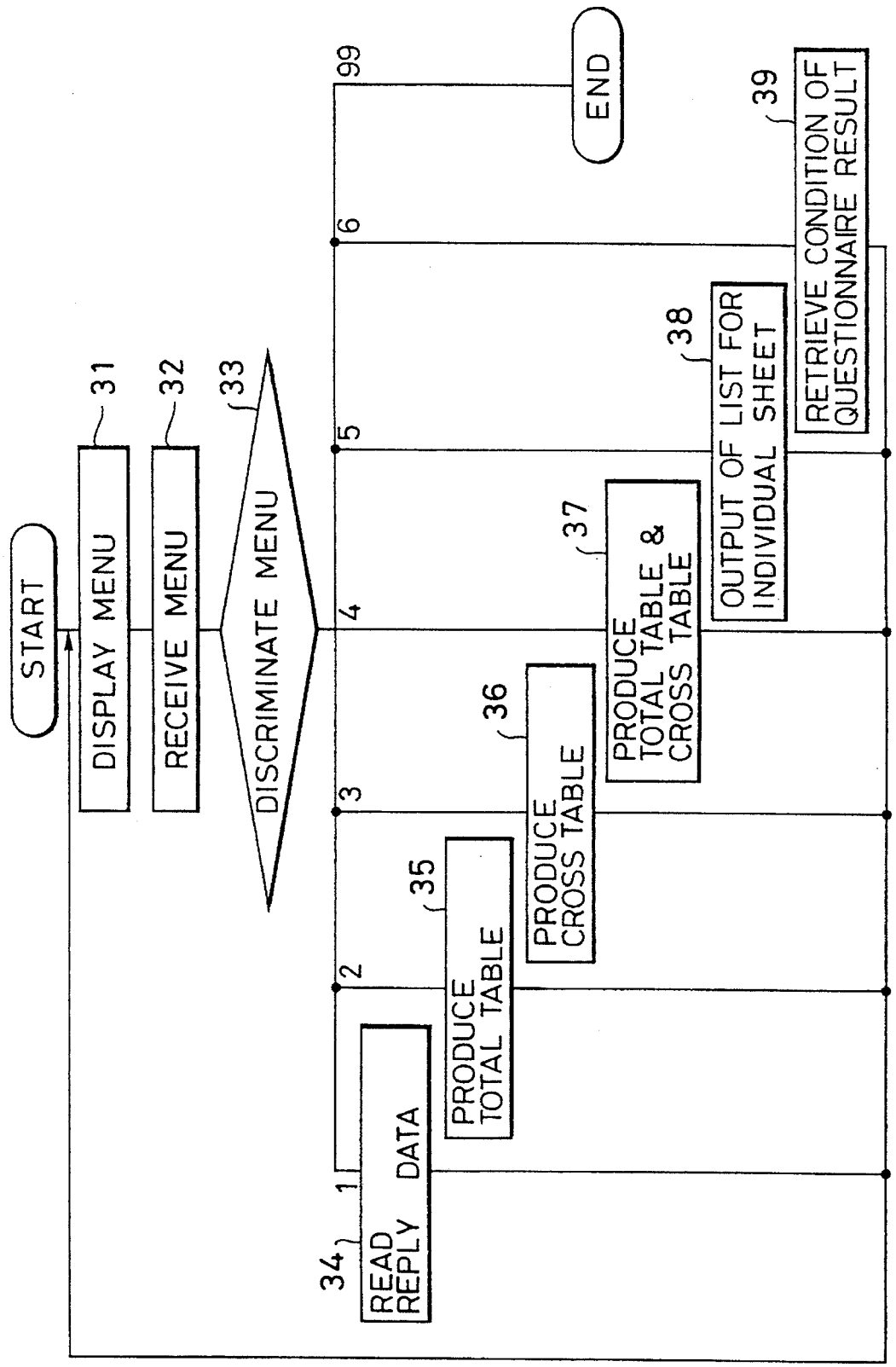
FIG. 27 is a flowchart illustrating the contents of a questionnaire totalizing and analyzing process.

FIG. 27 is a flow chart which illustrates the contents of the process to be performed by the questionnaire totalizing and analyzing program B3. The questionnaire totalizing and analyzing program B3 is started when an operator for analyzing the questionnaire turns on the power supply and performs an ordinary computer starting operation by using the keyboard A10 or the like. First, in step 31, a menu frame shown in FIG. 28 is displayed on the display A9. The number given to the menu discriminator which corresponds to the menu item displayed in the above-described menu frame is selected by the operator before it is input by the keyboard A10. As a result, the menu is received in step 32. In next step 33, the received menu item is discriminated in accordance with the menu discriminator.

If the menu discriminator is "1", the flow proceeds to step 34 in which the data set shown in FIG. 5 including the questionnaire data gathered by the questionnaire reply gathering system 2 is read from the memory card A11. The memory card A11 has been inserted into a predetermined slot in the above-described state.

If the menu discriminator is "2", the flow proceeds to step 35 in which gathering of read reply data in step 34 is performed to produce a total table, the contents of which are, for example, as shown in FIG. 29.

If the menu discriminator is "3", the flow proceeds to step 36 in which the reply data are gathered to produce a cross table as shown in FIG. 31.

If the menu discriminator is "4", the flow proceeds to step 37 in which the reply data are totalized and a table formed by combining the total table and the cross table, as shown in FIG. 32, is produced.

If the menu discriminator is "5", the flow proceeds to step 38 in which the reply data are totalized and put in order as shown in FIG. 33 so that a list for each individual sheet produced in units of questionnaire repliers is printed out.

If the menu discriminator is "6", the flow proceeds to step 39 in which the reply data are totalized and put in order before the condition of the reply result is retrieved in accordance with the retrieval condition.

If the menu discriminator is "99", the questionnaire totalizing and analyzing process in step 3 is completed.

The contents of each menu item shown in FIG. 28 will now be described.

(7) Reading of Questionnaire Reply Data

The memory card A11 which stores data including questionnaire reply data, as shown in FIG. 5, is inserted into a predetermined slot of the computer A12. Then, a data set including questionnaire reply data which corresponds to the final name instructed by the operator is read. Among the read data set, the questionnaire reply data, "title of the questionnaire", "number of the questions", "questionnaire element data", "questionnaire frame information", "number of questionnaire replies" and "questionnaire reply data" will be stored in the memory 13 in accordance with the data format shown in FIG. 6.

(8) Producing of Total Table

A desired file is retrieved from questionnaire reply data stored in the memory A13 in accordance with the operator's request to totalize the file depending upon the type of the reply choices with respect to the questions. In accordance with the result of the totalizing operation, a total table as shown in FIG. 29 is produced. Then, the total table produced is printed out by the printer A15. Furthermore, data in the total table are written to questionnaire reply data of the subject file in accordance with the format shown in FIG. 6.

(9) Producing of Cross Table

When the menu for producing the cross table is selected, a list of the file with which the cross table can be produced is selected from the questionnaire reply data stored in the memory A13 and is displayed on the display A9 as shown in FIG. 30A. A file, which is the subject of producing the cross table, is selected from the frame displayed on the display A9 by the key manipulation of the keyboard A10 so that a desired file is called.

Then, a frame for selecting the cross item is displayed on the display A9 as shown in FIG. 30B. The frame for selecting the cross item is, as shown in FIG. 30B, constituted by arranging the question Nos. in both the vertical and horizontal directions. When the operator selects a question, which must be cross-analyzed, by moving the cursor to the position at which the vertical question Nos. and the horizontal question Nos. intersect, the cross analysis is performed. As a result, the cross table shown in FIG. 31 is produced. The cross table thus produced is printed out by the printer A15. Furthermore, the cross table is written to the questionnaire reply process data of the subject questionnaire reply data file. Thus, the process is completed.

(10) Producing Total Table+Cross Table

The "total table+cross table" is constituted by combining the table shown in FIG. 29 and that shown in FIG. 31. When a menu of producing "total table+cross table" is selected in the menu frame shown in FIG. 28, the list of the file with which the cross table can be produced is selected from questionnaire reply data stored in the memory A13 similarly to the process of producing the cross table so as to be displayed on the display A9. A file which is the subject of producing the total table+cross table is selected from the frame displayed on the display A9 by manipulation of the keyboard A10 so that a desired file is called.

Then, a frame for selecting the cross item is displayed on the display A9 as shown in FIG. 30B. When the operator moves the cursor and selects a question which must be cross-analyzed, the cross analysis is executed. Therefore, the table is produced which has contents which, as shown in FIG. 32, are arranged by mixing the total table and the cross table. The total table+cross table thus produced is printed out by the printer A15. Then, the total table+cross table is written to the questionnaire reply process data of the subject questionnaire reply data file. Thus, the process is completed.

(11) Output of List for Each Individual Sheet

The display A9 and the keyboard A10 are operated while utilizing the questionnaire data file stored in the memory A13 so that the customer ID is input. As a result, various desired retrieval conditions are instructed. Therefore, a list for each individual sheet, the contents of which is composed of "who", "when", "question replied" and "contents of the reply" is produced before it is printed out.

(12) Retrieving of Condition of Reply Result

Figure 34:
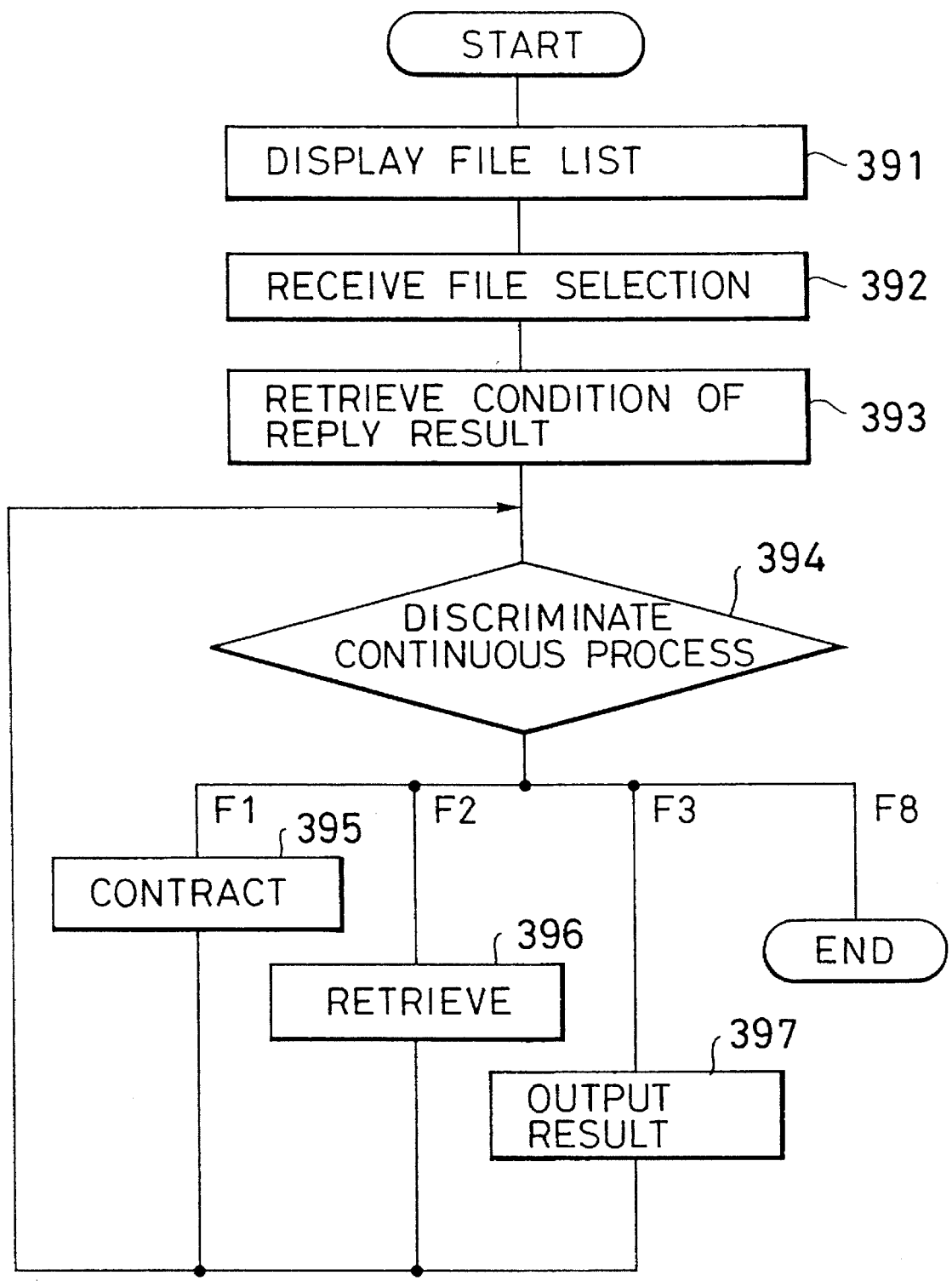
FIG. 34 is a flowchart which illustrates the contents of a condition retrieval process of the results of a reply.

FIG. 34 is a flow chart which illustrates the process of retrieving the condition of the reply result in step 39.

When menu discriminator "6" is selected on the menu frame shown in FIG. 28, a list of the questionnaire reply data files for selecting the subject of the condition retrieval as shown in a menu frame of FIG. 35A is displayed on the display A9 in step 391 shown in FIG. 34. When the operator selects a subject file and operates the keyboard A10, the file of the retrieval subject is received in step 392. As a result, a frame for inputting the retrieval item of the condition retrieval, as shown in FIG. 35B, is displayed. In step 393, the operator inputs the condition retrieval item of the reply result by using the display A9 and the keyboard A10 in a dialogue manner. In response to this, the retrieval is performed and the result of the retrieval is displayed on the display A9. According to an example shown in FIG. 35B, the number of repliers, which meets the conditions in which a reply of "1" is chosen in question No. 1 and as well as a reply of "1" is chosen in question No. 2, is obtained by the retrieval. Furthermore according to this example, there are "9" records about the repliers which meet the conditions as a result of the retrieval.

In the next step 394, the continuous process is discriminated in accordance with a key input corresponding to a function key symbol shown in FIG. 35B. In a case where the key "F1" is depressed, the flow proceeds to step 395 in which a contraction process is performed. The "contraction process" is a retrieval process in which another retrieval item is added to the result of the retrieval in step 393. In a case where the above-described contraction process has been completed, the result of the retrieval is displayed on the display A9.

In a case where a key input of "F2" is made, all of the results of the retrieval made in step 393 are cleared in step 396 before the retrieval is performed again.

In a case where a key input of "F3" is made, the result of the retrieval made in step 393 is transmitted from the printer A15 by using the display A9, the keyboard A10 and the printer A15 in a dialogue manner.

In a case where a key input of "F8" is made, the process of transmitting the list for an individual sheet in step 39 is completed before the flow returns to the flow shown in FIG. 27. When menu discriminator "99" is supplied in step 33, the questionnaire totalizing and analyzing process is completed.

Thus, a sequential process of producing the questionnaire, gathering the replies, totalizing and analyzing for the questionnaire operation is completed.

As described above, according to the questionnaire producing and aiding system 1 of this embodiment, the questionnaire element file and the questionnaire sheet file, each of which has been produced previously, are stored in the question master file in the memory A4. Therefore, the file containing questionnaire element 5 or a questionnaire sheet is available to be selected from the question master file so as to utilize it at the time of producing the questionnaire. As a result, the questionnaire producing operation can be significantly simplified and its efficiency can be improved as well.

Furthermore, the questionnaire reply gathering system 2 is arranged in such a manner that a laptop-type personal computer is used, and a memory card is employed as a medium for transmitting/receiving the questionnaire data file to and from the questionnaire reply gathering system 2. Therefore, the questionnaire can be easily conducted by moving the system to an arbitrary street or shop front.

In particular, the questionnaire data and reply data are stored in the memory card and data are transmitted/received to/from the questionnaire producing and aiding system 1 or the questionnaire totalizing and analyzing system 3. Therefore, the questionnaire can be conducted in a place in which no communication line is provided. Furthermore, the necessity of connecting the systems via the communication line can be eliminated. Therefore, the data transferring operation can easily be performed.

Furthermore, the structure in which the memory card such as the IC card is used exhibits excellent data maintaining performance in comparison to the flexible disk (FD) or the hard disk (HD) in which there is a risk of occurrence of abnormality of a failure due to a contact of the recording/reproducing head with the magnetic recording surface at the time of transportation.

Furthermore, the questionnaire reply gathering system 2 is arranged in such a manner that it can automatically be started simply by setting the memory card to a predetermined position and by supplying power, thanks to the automatic loading function arranged to act in accordance with the OS program stored in the memory card. Therefore, a person who is not skilled in computer operations can easily conduct the questionnaire.

Since the questionnaire reply gathering system 2 includes the function of preventing an erroneous reply and the limited reply processing function, the reliability of data obtained in the questionnaire can be improved.

The questionnaire totalizing and analyzing system 3 according to this embodiment is arranged in such a manner that reply data stored in the memory card are read to the computer, and the data totalizing and producing-operations such as producing of the total table, producing of the cross table and retrieving of the reply result, can easily be performed in a dialogue manner while looking at the display. Therefore, the operation efficiency can be improved.

Furthermore, according to the questionnaire system of this embodiment, a sequential operation relating to the questionnaire, composed of producing the questionnaire sheet, gathering reply data and producing and transmitting the analysis table, can be performed quickly and easily.

Although the invention has been described in its preferred form with a certain degree of particularity, it is understood that the present disclosure of the preferred form may be changed in the details of construction and in the combination and arrangement of parts without departing from the spirit and scope of the invention as hereinafter claimed.

What is claimed is:

1. A questionnaire producing and aiding system, comprising:

a computer including a processor, a memory, input means for inputting information to said computer, a display and connecting means used in connecting a portable storage medium to said computer;

wherein said memory stores at least one file which includes previously-produced questionnaire elements, each previously-produced questionnaire element having one previously-produced question and a plurality of previously-produced reply choices corresponding to said previously-produced question;

wherein said input means inputs 1) a readout command to read out said at least one file from said memory, 2) a selection command to select at least one of said previously-produced questionnaire elements of said at least one file, and 3) a new questionnaire element having one new question and a plurality of new reply choices corresponding to said one new question to said computer;

wherein said processor executes a questionnaire-producing program which 1) reads out said at least one file from said memory as a previously-produced questionnaire in response to said readout command, 2) selects said at least one of said previously-produced questionnaire elements in response to said selection command, 3) produces a new questionnaire by utilizing said selected previously-produced questionnaire element and said new questionnaire element input from said input means, 4) stores said new questionnaire into said portable storage medium, and 5) displays said new questionnaire; and wherein said new questionnaire includes said new questionnaire element and at least one of said previously-produced questionnaire elements, wherein said new questionnaire element includes a reply limitation condition, pursuant to which the new questionnaire skips to a specific question depending upon a selection of said reply choices by a user.

2. A questionnaire producing and aiding system according to claim 1, wherein said memory has a first file in which said previously-produced questionnaire elements forming said previously-produced questionnaire are stored by questionnaire, and a second file in which said previously-produced questionnaire elements are stored by questionnaire element.

3. A questionnaire producing and aiding system according to claim 2, wherein said questionnaire-producing program stores said new questionnaire element and said new questionnaire in said second file and said first file, respectively.

4. A questionnaire producing and aiding system according to claim 1, wherein said questionnaire-producing program produces a public relations display which displays a title and a purpose for performing said new questionnaire in response to information input from said input means, and stores said public relations display into said portable storage medium.

5. A questionnaire producing and aiding system according to claim 1, further comprising means for dispensing a service ticket upon successful completion of the new questionnaire by a user.

6. A questionnaire system, comprising:

a computer including a processor, input means for inputting information to said computer, a display, and connecting means used in connecting a portable storage medium to said computer, wherein said computer 1) reads out an autoloading program stored in said portable storage medium, 2) executes said autoloading program to start a questionnaire reply-gathering and producing program which a) reads out a questionnaire stored in said portable storage medium, b) displays said questionnaire on said display, c) gathers replied to questions of said questionnaire via said input means, d) produces a new questionnaire by utilizing said selected read-out questionnaire and a new questionnaire element input from said input means, said new questionnaire element including a reply limitation condition pursuant to which the new questionnaire skips to a specific question depending upon a user reply, and e) stores said new questionnaire and said replies into said portable storage medium.

7. A questionnaire reply gathering system according to claim 6, wherein said computer is a portable personal computer.

8. A questionnaire reply gathering system according to claim 6, wherein said portable storage medium is an IC card.

9. A questionnaire reply gathering system according to claim 6, further comprising means for dispensing a service ticket upon successful completion of the new questionnaire by a user.

10. A questionnaire system, comprising:

a first computer which constitutes a questionnaire-producing apparatus and an analyzing apparatus, and a second computer which constitutes a questionnaire reply-gathering terminal apparatus;

wherein said first computer includes a first processor, a memory, first input means for inputting information to said first computer, a first display and first connecting means for connecting a portable storage medium to said first computer;

wherein said memory stores at least one file which includes previously-produced questionnaire elements, each questionnaire element having one previously-produced question and a plurality of previously-produced reply choices corresponding to said previously-produced question;

wherein said first input means inputs a readout command to read out said at least one file from said memory, a selection command to select at least one of said previously-produced questionnaire elements of said at least one file read out, and a new questionnaire element having one new question and a plurality of new reply choices corresponding to said one new question to said first computer;

wherein said first processor executes a questionnaire-producing program which 1) reads out said at least one file from said memory as a previously-produced questionnaire in response to said readout command, then 2) selects said at least one of said previously-produced questionnaire elements in response to said selection command, 3) produces a new questionnaire by utilizing said selected previously-produced questionnaire element and said new questionnaire element input from said first input means, said new questionnaire element including a reply limitation condition pursuant to which the new questionnaire skips to a specific question depending upon a selection of said new reply choices by a user, 4) stores said new questionnaire into said portable storage medium, and 5) displays said new questionnaire;

wherein said first processor executes an analyzing program which reads out reply choices from said portable storage medium connected to said first connecting means, and then statistically analyzes said reply choices read out;

wherein said second computer includes a second processor, second input means for inputting information to said second computer, a second display, and second connecting means for connecting said portable storage medium to said second computer; and wherein said second computer a) reads out an autoloading program stored in said portable storage medium, b) executes said auto-loading program to start a questionnaire reply-gathering program, c) executes said questionnaire reply-gathering program which reads out said questionnaire stored in said portable storage medium connected to said second connecting means, d) displays said questionnaire on said second display, e) gathers reply choices to questions of said questionnaire via said second input means, and f) stores said reply choices into said portable storage medium.

11. A questionnaire system according to claim 10, wherein said memory has a first file in which said previously-produced questionnaire elements forming said previously-produced questionnaire are stored by questionnaire, and a second file in which said previously-produced questionnaire elements are stored by questionnaire element.

12. A questionnaire system according to claim 10, wherein said questionnaire-producing program stores said new questionnaire element and said new questionnaire in said second file and said first file, respectively.

13. A questionnaire system according to claim 10, wherein said second computer is a portable personal computer.

14. A questionnaire system according to claim 10, wherein said portable storage medium is an IC card.

15. A questionnaire system according to claim 10, wherein said new questionnaire has a question which requires a reply in the form of selecting an identification symbol to represent a user, and wherein said analyzing program statistically analyzes said reply by referring to said identification symbol.

16. A questionnaire system according to claim 10, comprising means for dispensing a service ticket upon successful completion of the new questionnaire by a user.

17. A questionnaire system, comprising:

a computer including a first processor, a memory, first input means for inputting information to said computer, a first display and first connecting means used in connecting an IC card to the computer;

wherein said memory stores a first file which includes previously-produced questionnaire elements, each questionnaire element having one previously-produced question and a plurality of previously-produced reply choices corresponding to said previously-produced question, and a second file which includes previously-produced questionnaires having said previously-produced questionnaire elements;

wherein said first input means inputs to said computer: 1) a readout command to read out one of said first file and said second file from said memory, 2) a selection command to select at least one of said previously-produced questionnaire elements of the file read out from said memory, and 3) a new questionnaire element having one new question and a plurality of new reply choices corresponding to said one new question;

wherein said first processor executes a questionnaire-producing program which a) reads out one of said first file and said second file from said memory in response to said readout command, then b) selects said at least one of said previously-produced questionnaire elements in response to said selection command, c) produces a new questionnaire which includes said selected previously-produced questionnaire element and said new questionnaire element input from said first input means, said new questionnaire element including a reply limitation condition pursuant to which the new questionnaire skips to a specific question depending upon a selection of said new reply choices by a user, d) stores said new questionnaire into said IC card, and e) displays said new questionnaire; and wherein said first processor executes an analyzing program which reads out reply choices stored in said IC card connected to said first connecting means, and statistically analyzes said reply choices read out; and a portable personal computer including a second processor, second input means for inputting information to said portable personal computer, a second display, and second connecting means used in connecting said IC card to said portable personal computer;

wherein said portable personal computer i) reads out an auto-loading program stored in said IC card, ii) executes said auto-loading program to start a questionnaire reply-gathering program, iii) executes said questionnaire reply-gathering program which reads out said questionnaire stored in said IC card connected to said second connecting means, then iv) displays said questionnaire on said second display, v) receives reply choices from a user to questions of said questionnaire via said second input means, vi) skips to a specific question responsive to a reply choice input by the user for skipping to said specific question, and stores said reply choices into said IC card.

18. A questionnaire system according to claim 17, comprising means for dispensing a service ticket upon successful completion of the new questionnaire by a user.

* * * * *